(12) United States Patent
Rhodes et al.

(10) Patent No.: US 12,125,212 B2
(45) Date of Patent: Oct. 22, 2024

(54) METHODS AND APPARATUS FOR HIGH-FIDELITY VISION TASKS USING DEEP NEURAL NETWORKS

(71) Applicant: Intel Corporation, Santa Clara, CA (US)

(72) Inventors: Anthony Rhodes, Portland, OR (US); Ke Ding, San Jose, CA (US); Manan Goel, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 732 days.

(21) Appl. No.: 17/132,810

(22) Filed: Dec. 23, 2020

(65) Prior Publication Data

US 2021/0118146 A1 Apr. 22, 2021

(51) Int. Cl.
*G06T 7/12* (2017.01)
*G06T 7/33* (2017.01)
*G06V 10/44* (2022.01)
*G06V 10/764* (2022.01)

(52) U.S. Cl.
CPC ............... *G06T 7/12* (2017.01); *G06T 7/33* (2017.01); *G06V 10/454* (2022.01); *G06V 10/764* (2022.01); *G06T 2207/20084* (2013.01)

(58) Field of Classification Search
CPC .... G06T 7/12; G06T 7/33; G06T 2207/20084
See application file for complete search history.

(56) References Cited

U.S. PATENT DOCUMENTS

| | | |
|---|---|---|
| 11,676,278 B2 | 6/2023 | Rhodes et al. |
| 11,875,254 B2 | 1/2024 | Rhodes et al. |
| 2020/0160528 A1 | 5/2020 | Rhodes et al. |
| 2020/0211188 A1 | 7/2020 | Gao et al. |
| 2021/0110198 A1 | 4/2021 | Rhodes et al. |
| 2022/0004810 A1* | 1/2022 | Sinha .................. G06V 10/454 |

OTHER PUBLICATIONS

Chen, L. C., Zhu, Y., Papandreou, G., Schroff, F., & Adam, H. (2018). Encoder-decoder with atrous separable convolution for semantic image segmentation. In Proceedings of the European conference on computer vision (ECCV) (pp. 801-818). (Year: 2018).*

(Continued)

*Primary Examiner* — Bobbak Safaipour
*Assistant Examiner* — Ashley L. Hytrek
(74) *Attorney, Agent, or Firm* — Hanley, Flight & Zimmerman, LLC

(57) ABSTRACT

Methods, systems, and apparatus for high-fidelity vision tasks using deep neural networks are disclosed. An example apparatus includes a feature extractor to extract low-level features and edge-enhanced features of an input image processed using a convolutional neural network, an eidetic memory block generator to generate an eidetic memory block using the extracted low-level features or the extracted edge-enhanced features, and an interactive segmentation network to perform image segmentation using the eidetic memory block, the eidetic memory block used to propagate domain-persistent features through the segmentation network.

18 Claims, 15 Drawing Sheets

(56) References Cited

OTHER PUBLICATIONS

S. Majumder and A. Yao, "Content-Aware Multi-Level Guidance for Interactive Instance Segmentation," 2019 IEEE/CVF Conference on Computer Vision and Pattern Recognition (CVPR), Long Beach, CA, USA, 2019, pp. 11594-11603, doi: 10.1109/CVPR.2019.01187. (Year: 2019).*

European Patent Office, "Extended European Search Report", issued in connection with European Patent Application No. 21197371.4, Mar. 17, 2022, 8 pages.

European Patent Office, "Communication pursuant to Article 94(3) EPC," in connection with European Patent Application No. 21197371.4, issued on Jun. 4, 2024, 5 pages.

* cited by examiner

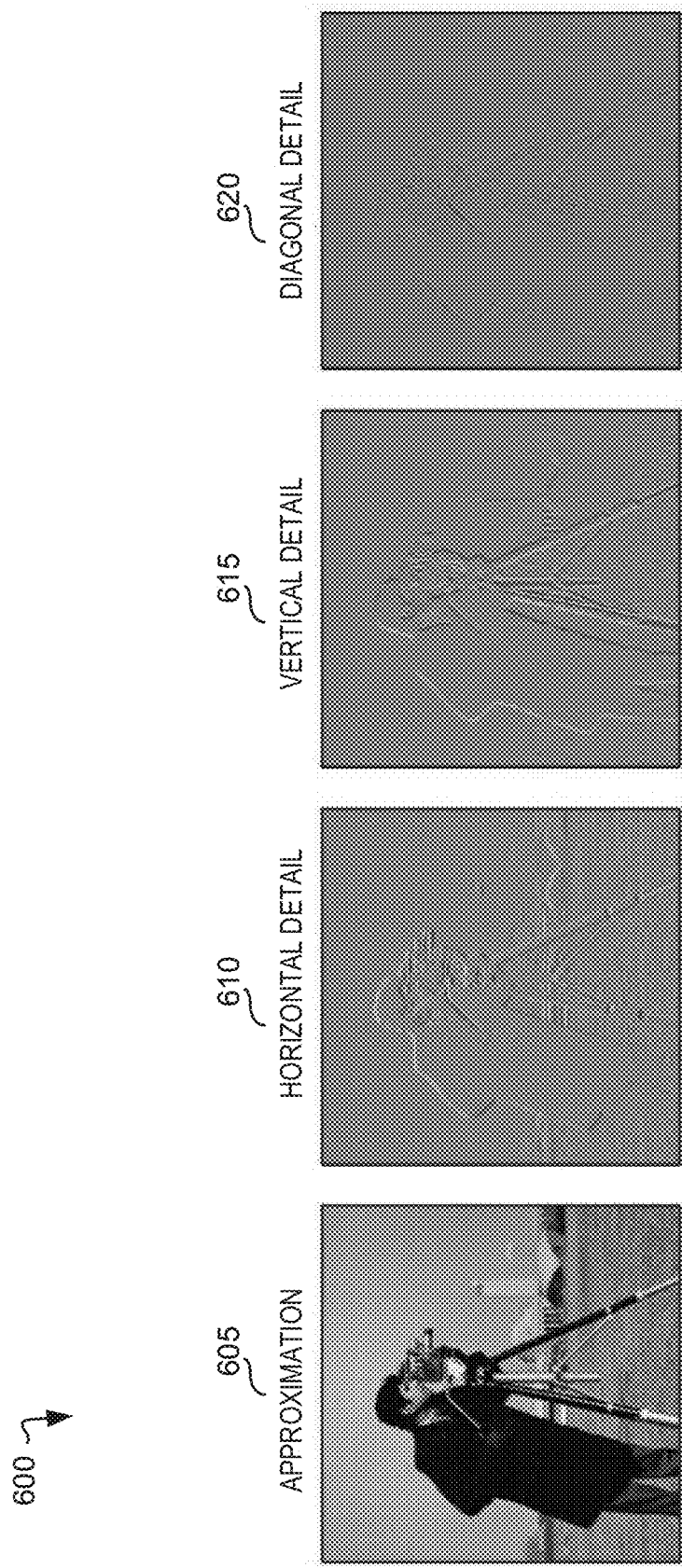

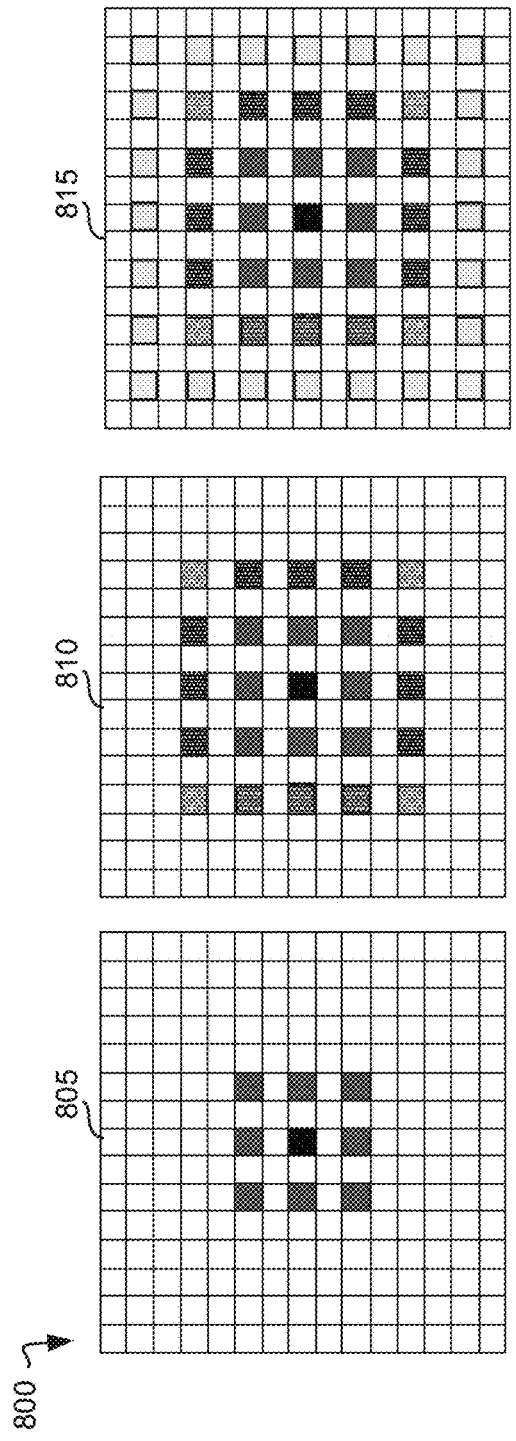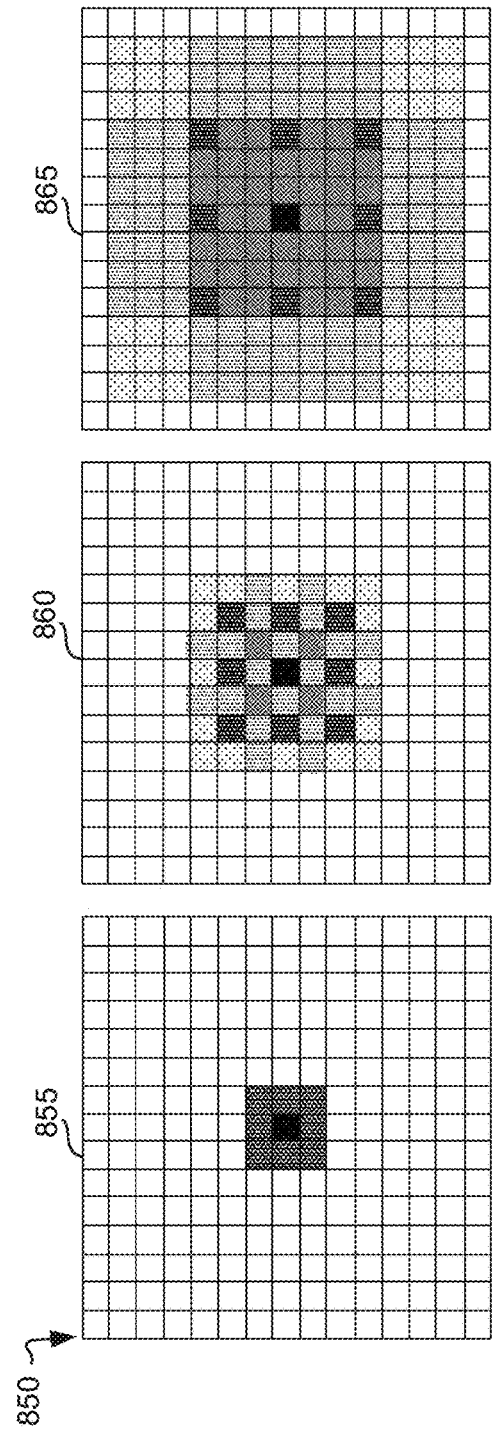
FIG. 8A
FIG. 8B

| MODEL | MEAN TRAIN LOSS | VAL mIOU | VAL medIOU |
|---|---|---|---|
| BASELINE WITHOUT EMB | 0.1460 | 0.7300 | 0.8180 |
| BASELINE WITH EMB | 0.1356 | 0.7533 | 0.8361 |

METHODS AND APPARATUS FOR HIGH-FIDELITY VISION TASKS USING DEEP NEURAL NETWORKS

BACKGROUND

Deep neural networks (DNNs) have revolutionized the field of artificial intelligence (AI) with state-of-the-art results in many domains including computer vision, speech processing, and natural language processing. Neural networks operate, for example, using artificial neurons arranged into layers that process data from an input layer to an output layer, applying weighting values to the data during the processing of the data.

BRIEF DESCRIPTION OF THE DRAWINGS

FIG. 6 is a graphical illustration showing an example discrete wavelet transformation applied to an input image to generate edge-enhanced features.

FIG. 8A is an illustration of an example interleaving conventional convolution operation with atrous convolutions in inception-atrous-collation (IAC) blocks.

FIG. 8B is an illustration of an example sequential atrous convolution operation leading to gridding.

Figure 1:
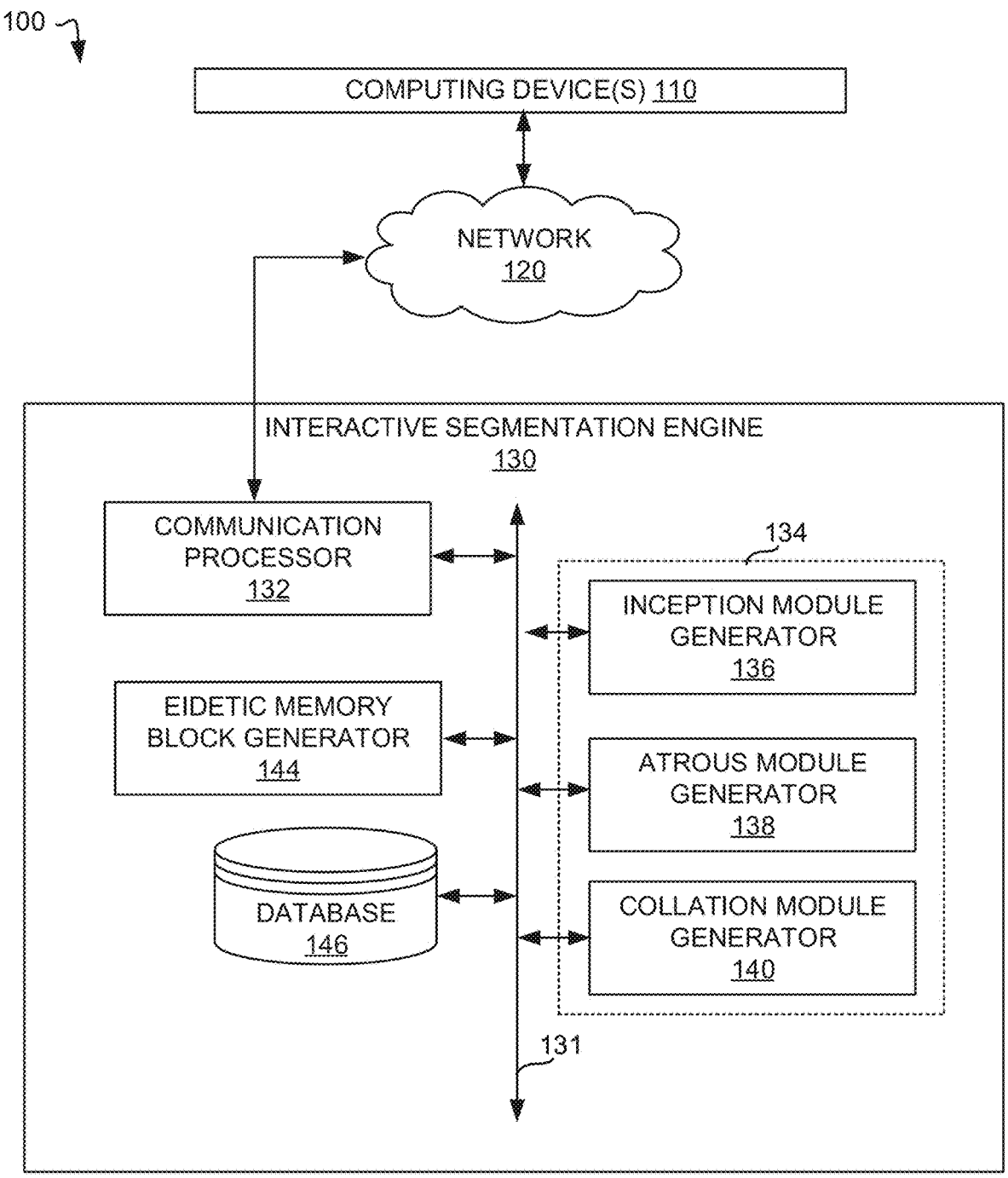
FIG. 1 is a block diagram of an example network including an example interactive segmentation engine.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Methods, systems, and apparatus for high-fidelity vision tasks using deep neural networks are disclosed herein. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once training is complete, the model is deployed for use as an executable construct that processes an input and provides an output based on the network of nodes and connections defined in the model. Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

ML/AI models have been applied to improve many areas of technology including digital image processing. Digital image processing tasks typically utilize convolutional neural networks (CNNs), although additional or alternative ML/AI models may be used. Image segmentation and/or object segmentation is one example of a digital image processing operation that is aided by ML/AI models. Object segmentation involves partitioning digital images into multiple segments (e.g., sets of pixels, sometimes referred to as image objects). In some examples, segmentation is performed to convert a raw image into a format that is more meaningful to and/or easier to analyze with a machine. Object segmentation processes label pixels in an image such that those pixels with the same label share similar characteristics. For example, segmentation processes locate objects within an image and/or boundaries of entities (e.g., objects, spaces, etc.) within the image.

Object and/or image segmentation has many applications including content-based image retrieval, machine vision (e.g., computer vision), medical imaging (e.g., volume rendered images from computer tomography and magnetic resonance imaging), object detection (e.g., pedestrian detection, face detection, brake light detection, object location in satellite images, etc.), recognition tasks (e.g., face recognition, fingerprint recognition, iris recognition, etc.), traffic control systems, video surveillance, video object co-segmentation and action localization, among others. As described above, digital image processing operations, such as image segmentation, often utilize CNNs. CNNs include an input layer, an output layer, and multiple hidden layers. The hidden layers of a CNN include one or more convolutional layers, one or more rectified liner unit (ReLU) layers, one or more pooling layers, one or more fully connected layers, and/or one or more normalization layers. The input to CNNs are tensors (e.g., a multidimensional array) specifying the number of images in a dataset, the height of the images, the width of the images, and the depth of the images (e.g., the number of bits specifying the color of a pixel in the image). The convolutional layers of CNNs abstract the input images to a feature map that is represented by a tensor specifying the number of images, the feature map height, the feature map width, and the feature map channels (e.g., red, green, blue images include three channels). Convolutional layers include convolution kernels (sometimes referred to as filters) and a number of input and output channels. In CNNs, the size of the kernel (e.g., height and width) may be thought of as the field of view of the convolution. To increase the field of view of convolutions, some CNNs implement atrous convolutions (sometimes referred to as dilated convolutions). Atrous convolutions also reduce or maintain the number of convolutions and/or kernel size needed in a CNN to obtain a desired result. Atrous convolutions were introduced to aid in image segmentation, a pixel level processing task (e.g., object outlining). On the other hand, inception convolutions are typically applied for separate tasks, picture level processing tasks (e.g., image classification).

Due to its inherent complexity, work on object segmentation has been ongoing since the inception of computer vision. While the majority of segmentation tasks have relied on the use of hand-crafted features and distance metrics, convolutional networks have become the standard model for representing prior knowledge related to object appearances. Current methods include the use of interactive object segmentation, which allows human annotators to extract an object-of-interest by providing user-based information (e.g., bounding boxes, positive clicks inside an area of the object-of-interest, negative clicks outside an area of the object-of-interest, etc.). However, improvements to methods for high-fidelity vision tasks, including interactive object segmentation, are needed to ensure segmentation accuracy and reproducibility.

Methods, systems, and apparatus disclosed herein use eidetic memory blocks (EMBs) to address the high-fidelity problem of interactive object segmentation. In some examples, methods and apparatus disclosed herein can be applied to automating the task of rotoscoping (e.g., the process of transferring an image into another video sequence) for graphics effects workflows. However, applications of the methods and apparatus disclosed herein are not limited to computer vision-based tasks and can be applied in any other areas of potential use (e.g., medical imaging applications).

Methods and apparatus disclosed herein provide a general architectural innovation to convolutional neural networks (CNNs) through the introduction of recurrent EMBs consisting of a combination of low-level, pre-trained features, features rendered using a wavelet transformation and "contextual" features, including an input image and various user-enabled features, referred to herein as "domain-persistent" (DP) features. Compared to known generic deep CNN architectures, methods and apparatus disclosed herein provide several improvements, namely (1) EMB contributes substantially to model efficiency by reducing the total number of parameters required by a model. This is primarily achieved by reducing the prevalence of the dilution of DP features in deep networks (in this way the network is not required to allocate extra resources to encode DP features, layer-by-layer), and (2) in addition to improved network efficiency, these features enhance network inference quality for high-fidelity applications (e.g., pixel-level segmentation, image upsampling, high-resolution image classification, etc.). As such, methods and apparatus disclosed herein focus on addressing the high-fidelity problem of interactive object segmentation. Interactive image segmentation is framed as the problem of applying user input (e.g. positive and negative clicks, approximate segmentations) to automatically render a pixel-level segmentation of an object of interest in an image. While methods and apparatus disclosed herein focus on the specific task of interactive image segmentation, EMB blocks are generalizable across any CNN-based architecture, regardless of the intended use-case (e.g., classification, video interpolation, GANs, AEs, etc).

FIG. 1 is a block diagram of an example network diagram 100 including example computing device(s) 110, an example network 120, and an interactive segmentation engine 130. In the example of FIG. 1, the interactive segmentation engine 130 includes an example communication processor 132, an example model executor 134, an example eidetic memory block generator 144, and/or an example database 146. In one example, the communication processor 132, the model executor 134, the eidetic memory block generator 144, and/or the database 146 are communicatively coupled via an example communication bus 131.

The computing device(s) 110 can be end user device(s) implemented by a mobile phone, a tablet computer, a desktop computer, a server, among others, including one or more analog or digital circuit(s), logic circuits, programmable processor(s), programmable controller(s), GPU(s), DSP(s), ASIC(s), PLD(s) and/or FPLD(s). The computing device(s) 110 can additionally or alternatively be implemented by a CPU, GPU, an accelerator, a heterogeneous system, among others. In some examples, the computing device(s) 110 permit users to purchase a product and/or service from the interactive segmentation engine 130 to access one or more machine learning models trained to dynamically interleave inception convolution operations of varying sizes with atrous convolutions of varying sizes and collate the resulting features with context-based skip connections. In some examples, computing device(s) 110 can be used to access the one or more trained models by downloading the one or more models from the interactive segmentation engine 130, accessing a web-interface hosted by the interactive segmentation engine 130 and/or another device. In some examples, the computing device(s) 110 permit installation of a plugin to implement a machine learning application (e.g., the interactive segmentation engine 130).

In some examples, the computing device(s) 110 can be used to access an application programming interface (API), graphics user interface (GUI), and/or other interface that displays one or more images. In some examples, one or more user(s) operating the computing device(s) 110 may select one or more images from a directory. In additional or alternative examples, the user operating the computing device(s) 110 may select the one or more images from an online directory hosted by the interactive segmentation engine 130. In some examples, the one or more images correspond to one or more distinct images. In additional or alternative examples, the one or more images correspond to a sequence of images (e.g. video). After the user selects the one or more images from a directory, the user may select and/or click on one or more objects and/or other areas in the one or more images (e.g., user-based input image feedback). For example, if the user selects an area within an object, the interactive segmentation engine 130 can categorize that click as a positive click that identifies the object as an object of interest. If the user selects an area outside of the object, the interactive search engine 130 can categorize the click as a negative click. In some examples, the user operating the computing device(s) 110 can access the interactive segmentation engine 130 to perform rotoscoping, which includes transferring an image from one image and/or video sequence into another video sequence. For example, rotoscoping is a process performed in graphics effects workflows. In additional or alternative examples, the user operating the computing device(s) 110 can access the interactive segmentation engine 130 to aid in medical imaging applications.

The network 120 can be implemented using any suitable wired and/or wireless network(s) including, for example, one or more data buses, one or more Local Area Networks (LANs), one or more wireless LANs, one or more cellular networks, one or more private networks, one or more public networks, etc. The network 120 can be an enterprise network (e.g., within businesses, corporations, etc.), a home network, among others. The example network 120 enables the interactive segmentation engine 130 and the computing device(s) 110 to communicate. As used herein, the phrase "in communication," including variances thereof (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

The communication processor 132 can be implemented using a network interface controller. Furthermore, the communication processor 132 can be implemented using one or more analog or digital circuit(s), logic circuits, programmable processor(s), programmable controller(s), GPU(s), DSP(s), ASIC(s), PLD(s) and/or FPLD(s). The communication processor 132 functions as a network interface structured to communicate with other devices in communication with the network 120 with a designated physical and data link layer standard (e.g., Ethernet or Wi-Fi). For example, the communication processor 132 can host an API, a GUI, and/or other interface through which a user operating the computing device(s) 110 can enter information to the interactive segmentation engine 130. In the illustrated example of FIG. 1, the communication processor 132, in response to a user operating the computing device(s) 110 selecting one or more images on which to perform interactive segmentation, displays the one or more images. The communication processor 132 additionally or alternatively monitors the interface for one or more selections (e.g., clicks) from the user operating the computing device(s) 110. After the interactive segmentation engine 130 has completed image segmentation for the one or more images, the communication processor 132 can display the one or more object segments that were identified based on the user-input. In additional or alternative examples, the communication processor 132 determines whether the user selected additional one or more images on which to perform image segmentation using the interactive segmentation engine 130.

The model executor 134 includes an example inception module generator 136, an example atrous module generator 138, and/or an example collation module generator 140. The model executer 134 permits the interactive segmentation engine 130 to implement a deep CNN including one or more inception-atrous-collation (IAC) layers to dynamically interleave inception convolution operations of varying sizes with atrous convolutions of varying sizes and collate the resulting features with context-based skip connections. By allowing for network paths of a deep CNN (and/or other network) executed by the interactive segmentation engine 130 that increase the receptive field of the deep CNN and densely populating the sparse signal created by sequential atrous convolutions, the interactive segmentation engine 130 supplements the parameters missing from sequential atrous convolutions, avoiding gridding, as described in connection with FIG. 8A. In the illustrated example of FIG. 1, the model executor 134 executes one or more deep CNNs including IAC layers, which are implemented using the inception module generator 136, the atrous module generator 138, and/or the collation module generator 140 (e.g., convolutional neural networks).

The inception module generator 136 generates inception feature(s) related to a dense representation of the input image(s) provided via the computing device(s) 110. In some examples, the inception module generator 136 determines when to skip and/or otherwise bypass the inception sublayer of the current IAC layer if performing inception convolutions would not be advantageous (e.g., the input matrix the inception sublayer is already densely populated. For example, the inception module generator 136 can perform a 1×1 convolution to preserve residual feature data in the input feature matrix and/or matrices. Generally, the output of the inception sublayer is referred to as inception features. In some examples, inception features are represented by activation values (sometimes referred to as activations). In some examples, the inception module generator 136 uses a standard inception module (e.g., GoogLeNet, CVPR 2016, etc.). These modules consist of sub-networks which apply, in order, 1×1 convolutions and maxpooling for dimensionality reduction, followed by disparate sized convolutions (e.g., 3×3, 5×5). Additionally, the inception module generator 136 can be used to concatenate all features together. In some examples, the inception module generator 136 designates a "residual" path which allows information to effectively bypass convolution operations altogether.

The atrous module generator 138 generates atrous feature(s) to expand a network field of view. For example, the atrous module generator 138 implements a sub-network of 1×1 convolutions (for dimensionality reduction), followed by atrous convolutions of different sizes (e.g., 3×3 and 5×5), in addition to a residual "bypass" path. For example, the atrous module generator 138 determines whether to skip the atrous sublayer of the current IAC layer. For example, the atrous module generator 138 may determine to skip the inception sublayer of the current IAC layer if the performing atrous convolutions would not be advantageous. In some examples, the atrous module generator 138 performs a 1×1 convolution on the embedded inception features and concatenates the result. In this manner, the atrous module generator 138 preserves residual feature data in the embedded inception features. Generally, the output of the atrous sublayer is referred to as atrous features. In some examples, atrous features are represented by activation values (sometimes referred to as activations). Alternatively, if the atrous module generator 138 determines not to skip the atrous sublayer of the current IAC layer, the atrous module generator 138 performs two parallel operations on the embedded inception features. In some examples, the atrous module generator 138 generates one or more atrous features to expand the effective receptive field of view of the deep CNN.

The collation module generator 140 assimilates multi-scale information from the inception module generated using the inception module generator 136, the atrous module generated using the atrous module generator 138, and/or the EMBs generated using the eidetic memory block generator 144. For example, the collation module generator 140 fills in holes (e.g., sparse datapoints in the atrous features) in the ERF of the deep CNN with the dense inception features. Additionally, the collation module generator 140 determines whether there are additional IAC layers to be executed. If the collation module generator 140 determines that there are additional IAC layers to be executed, the collation module generator 140 determines whether to skip the next IAC layer (e.g., the subsequent IAC layer) of the deep CNN. For example, the collation module generator 140 may determine to skip the next IAC layer if there are varying dimensions between the input image to the neural network and the desired output image. Overall, the collation module generator 140 generates a collation module that consists of a single 1×1 convolutional layer which assimilates, together, the multi-scale information provided by the inception module, atrous module and EMBs. The collation module provides the network with a means to calibrate persistent components of the network input (e.g. input image, user-provided labels) with densely rendered, multi-scale features. The network uses these persistent features as a template for determining the importance of different multi-scale features. Because the network does not need to allocate extra overhead to encode these persistent features, the network gains additional efficiency.

The eidetic memory block generator 144 generates eidetic memory blocks (EMBs) based on eidetic memory features such as context features, the input image, and user inputs (e.g., positive and/or negative clicks). For example, the eidetic memory block generator 144 extracts activations generated by low-level features from a pre-trained model (e.g., a VGG layer and/or a VGG network). In some examples, the eidetic memory block generator 144 processes the input image using a Discrete Wavelet Transform (DWT) to generate an edge-enhanced version of the input image. Specifically, a Haar wavelet decomposition can be used due to its amiable orthogonality properties, yielding an edge-enhanced decomposition of the input image into independent parts. In some examples, the eidetic memory block generator 144 concatenates these features with additional, application-dependent user provided features (e.g., positive/negative clicks, splines, etc., as in the case interactive image processing use-cases). In some examples, these domain-persistent features can be propagated in a recurrent fashion throughout the network via skip connections, as described in more detail in connection with FIGS. 2-3.

The database 146 is configured to store data. For example, the database 146 can store one or more files indicative of one or more trained models, one or more IAC layers, one or more features (e.g., inception features, atrous features, collated features, embedded versions thereof, context features, feature volumes, hyper-columns, eidetic memory features), and/or one or more image segments. In the example of FIG. 1, the database 146 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The example database 146 may additionally or alternatively be implemented by one or more double data rate (DDR) memories, such as DDR, DDR2, DDR3, DDR4, mobile DDR (mDDR), etc. In additional or alternative examples, the example database 146 may be implemented by one or more mass storage devices such as hard disk drive(s), compact disk drive(s), digital versatile disk drive(s), solid-state disk drive(s), etc. While in the illustrated example the database 146 is illustrated as a single database, the database 146 may be implemented by any number and/or type(s) of databases. Furthermore, the data stored in the database 146 may be in any data format such as, for example, binary data, comma delimited data, tab delimited data, structured query language (SQL) structures, etc.

Figure 2:
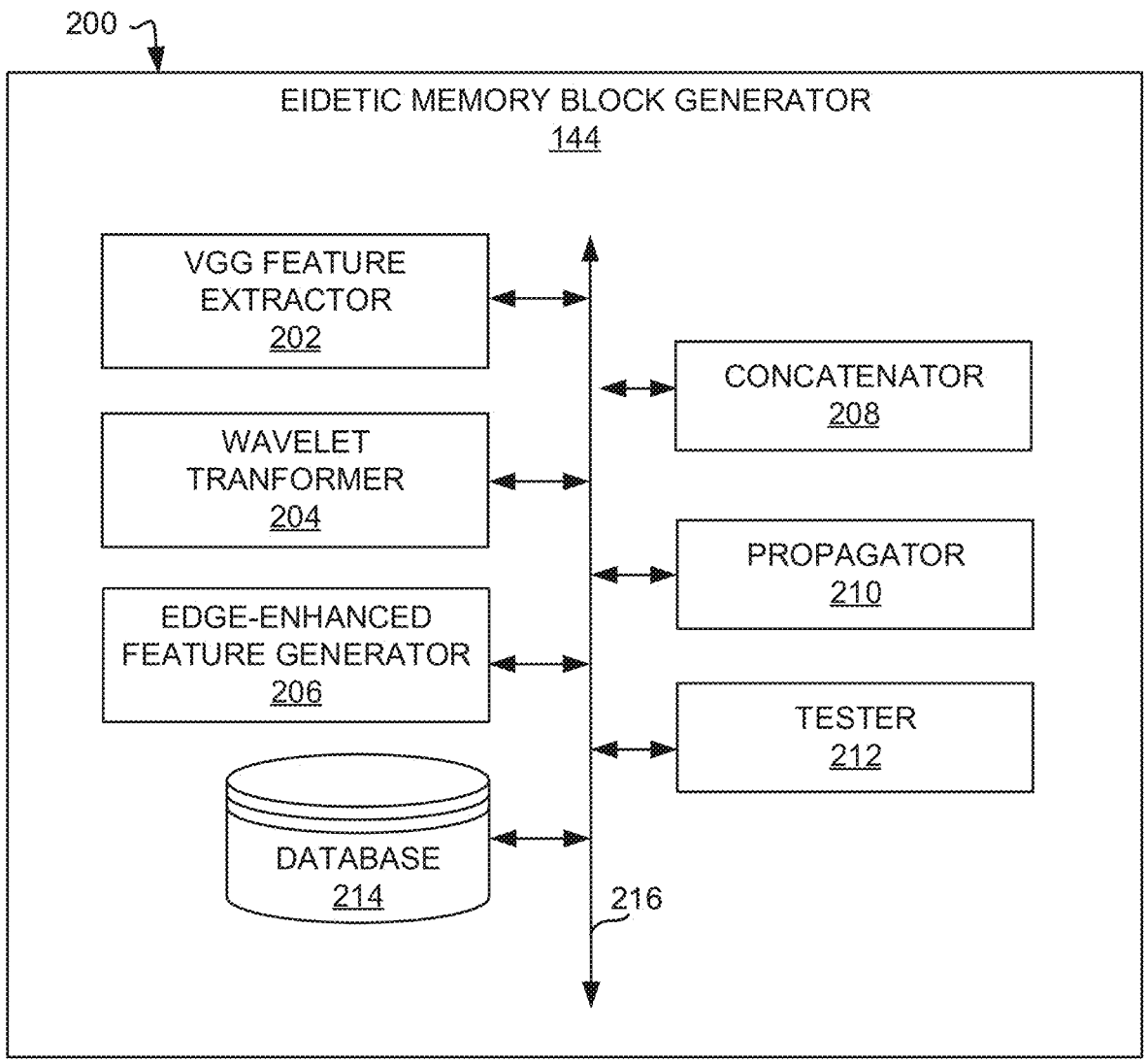
FIG. 2 is a block diagram of an example eidetic memory block generator.

FIG. 2 is a block diagram 200 showing an example of the eidetic memory block generator 144 of FIG. 1. The eidetic memory block generator 144 includes an example VGG feature extractor 202, an example wavelet transformer 204, an example edge-enhanced feature generator 206, an example concatenator 208, an example propagator 210, an example tester 212, and/or an example database 214. The VGG feature extractor 202, the wavelet transformer 204, the edge-enhanced feature generator 206, the concatenator 208, the propagator 210, the tester 212, and/or the database 214 are communicatively coupled via an example communicative bus 216.

The VGG feature extractor 202 extracts low-level, pre-trained features using the VGG-based convolutional neural network. For example, the VGG feature extractor 202 can use the well-known VGG-19 network (ICLR 2015) as a pre-trained network for feature extraction. For example, neural networks learn hierarchical feature representations that can be used to discover latent patterns in complex and high-dimensional data. Moreover, CNNs tend to learn primitive visual features (e.g., blob detection, edge orientations, etc.) in their early layers and more complex visual features, such as compositions of parts of objects, in later layers. To render part of the EMB, the VGG feature extractor 202 passes an input image through a pre-trained CNN (e.g., the VGG-19) and extracts the activations corresponding with 'conv_1', as described in connection with FIG. 5. For example, these activations can correspond with the first convolutional block of dimension 224×224×64. Such features capture low-level, domain-persistent features and are "dense" in the sense that these activations are generated in the native resolution of the input image and thus avoid information loss caused by sub-sampling in later layers of the network.

The wavelet transformer 204 can be used to extract edge-enhanced features from an input image once low-level, domain-persistent features have been extracted using the VGG feature extractor 202. For example, the wavelet transformer 204 can be used to process an input image with a wavelet transformation to render orthogonal, edge-enhanced features. These features represent part of the EMB-specific domain-persistent feature set. In some examples, the wavelet transformer 204 uses discrete Haar wavelets for their computational simplicity and orthogonality properties. For example, a generic Haar wavelet function $\psi(t)$ can be defined in accordance with Equation 1:

$$\psi(t) = \begin{cases} 1 & 0 \le t \le 1 \\ -1 & 0 \le t \le 1 \\ 0 & \text{else} \end{cases} \quad (1)$$

As such, for every integer pair, n, k, the Haar function $\psi_{n,k}(t)$ can be defined over in accordance with Equation 2:

$$\psi_{n,k}(t) = 2^{\frac{n}{2}} \psi(2^n t - k), t \in i \quad (2)$$

Such functions satisfy the following properties, where $L^2(i)$ denotes the $L^2$ Hilbert Space, as shown in Equation 3 below:

$$\int_i \psi_{n,k}(t) dt = 0, \|\psi_{n,k}\|_{L^2(i)} = \int_i \psi_{n,k}(t)^2 dt = 1 \quad (3)$$

Furthermore, Haar functions are pairwise orthogonal, so the condition shown in Equation 4 also holds, where $\delta_{ij}$ connotes the Kronecker delta function:

$$\int_i \psi_{n_1,k_1}(t) \psi_{n_2,k_2}(t) dt = \delta_{n_1,n_2} \delta_{k_1,k_2} \quad (4)$$

In some examples, wavelet transformer 204 expresses the 2×2 Haar matrix corresponding to the Haar wavelet as the following:

$$H_2 = \begin{bmatrix} 1 & 1 \\ 1 & -1 \end{bmatrix}$$

Therefore, the wavelet transformer 204 can transform any sequence $(a_0, a_1, \ldots, a_{2n}, a_{2n+1})$ of even length (e.g., the encoding of an image), into a sequence of two-component-vectors: $((a_0, a_1), \ldots, (a_{2n}, a_{2+1}))$. Post-multiplying these vectors with $H_2$ generates the next iteration of the fast Haar-wavelet transform. In a similar fashion, the wavelet transformer 204 can generate blocks of four elements constituting a 4×4 Haar matrix comprised of four 2×2 pairwise orthogonal blocks:

$$H_4 = \begin{bmatrix} 1 & 1 & 1 & 1 \\ 1 & 1 & -1 & -1 \\ 1 & -1 & 0 & 0 \\ 0 & 0 & 1 & -1 \end{bmatrix}$$

In practice, repeated post-multiplying by the 2×2 blocks in $H_4$ is commonly used for data (viz., image) compression, as in standard JPEG compression. Here, the wavelet transformer 204 uses the 2×2 filters in $H_4$ to perform fast, orthogonal edge-enhancement. For example, the 2×2 matrix in the upper-right of $H_4$ provides a vertical edge enhancement, the 2×2 matrix in the lower-left of $H_4$ yields a horizontal edge enhancement, and the 2×2 matrix in the bottom-right of $H_4$ gives a diagonal edge enhancement. As such, the wavelet transformer 204 obtains edge-enhanced features via discrete wavelet transform(s) (DWTs) using $H_4$ on a sample image, as shown in connection with FIG. 6.

The edge-enhanced feature generator 206 obtains edge-enhanced features using the wavelet transformer 204. For example, the edge-enhanced feature generator 206 retrieves the computational result(s) obtained as a result of the wavelet transformation to determine the edge-enhanced features data that is used as part of the eidetic memory block generation process, as described in connection with FIG. 4. For example, the edge-enhanced feature generator 206 applies the wavelet transformer 204 to determine edge-enhanced features for one or more input image(s) provided by a user (e.g., via computing device(s) 110).

The concatenator 208 concatenates together input from the VGG feature extractor 202 and/or the edge-enhanced feature generator 206. For example, the concatenator 208 concatenates (1) L1 features from VGG-19 on the input image, (2) the edge-enhanced input image features yielded by DWT using the wavelet transformer 204, and (3) user-based input (e.g., positive and negative user click matrices: $S_p$ and $S_n$). In some examples, the concatenator 208 also concatenates distance transforms masks (e.g., $T_p$ and $T_n$) in addition to the features listed above. The positive and negative distance transforms (e.g., $T_p$ and $T_n$) can be defined as shown below:

$$T_p(p) = \min_{q \in S_p} \|p - q\|_2$$

$$T_n(p) = \min_{q \in S_n} \|p - q\|_2$$

Altogether this tensor of domain-persistent features constitutes an eidetic memory block (EMB). The EMBs can be introduced into the segmentation network during interactive segmentation to enhance the segmentation process. For example, input to the segmentation network f can include the current query image $X_t$, positive and negative user clicks (e.g., $S_p$ and $S_n$, rendered as 2-D matrices in the native resolution of the input image), and distance transforms defined by the clicks (e.g., $T_p$ and $T_n$, also rendered in the native resolution of the input image size), as well as per-pixel hypercolumn deep features generated VGG-19, as described in connection with FIG. 7A. During segmentation, the eidetic memory block generator 144 can propagate domain-persistent features (e.g., obtained using the EMBs) via the propagator 210 using skip connections, as described in connection with FIG. 3. For example, each respective collation module of the IAC blocks (e.g., generated using the collation module generator 140) can receive an EMB as input, as described in connection with FIG. 12A.

The propagator 210 propagates domain-persistent features of EMBs using skip connections during the interactive segmentation process. For example, instead of proceeding to the inception module (e.g., to generate inception feature(s)) and/or the atrous module (e.g., to generate atrous feature(s)), the propagator 210 can be used to propagate domain-persistent features of the EMBs using skip connections, thereby bypassing the inception and/or atrous modules and proceeding directly to the collation module to assimilate multi-scale information. In some examples, the propagator 210 proceeds to propagate the domain-persistent features from one collation module to another collation module in the presence of additional IAC layers, as described in connection with FIG. 3.

Figures 12A, 12B:
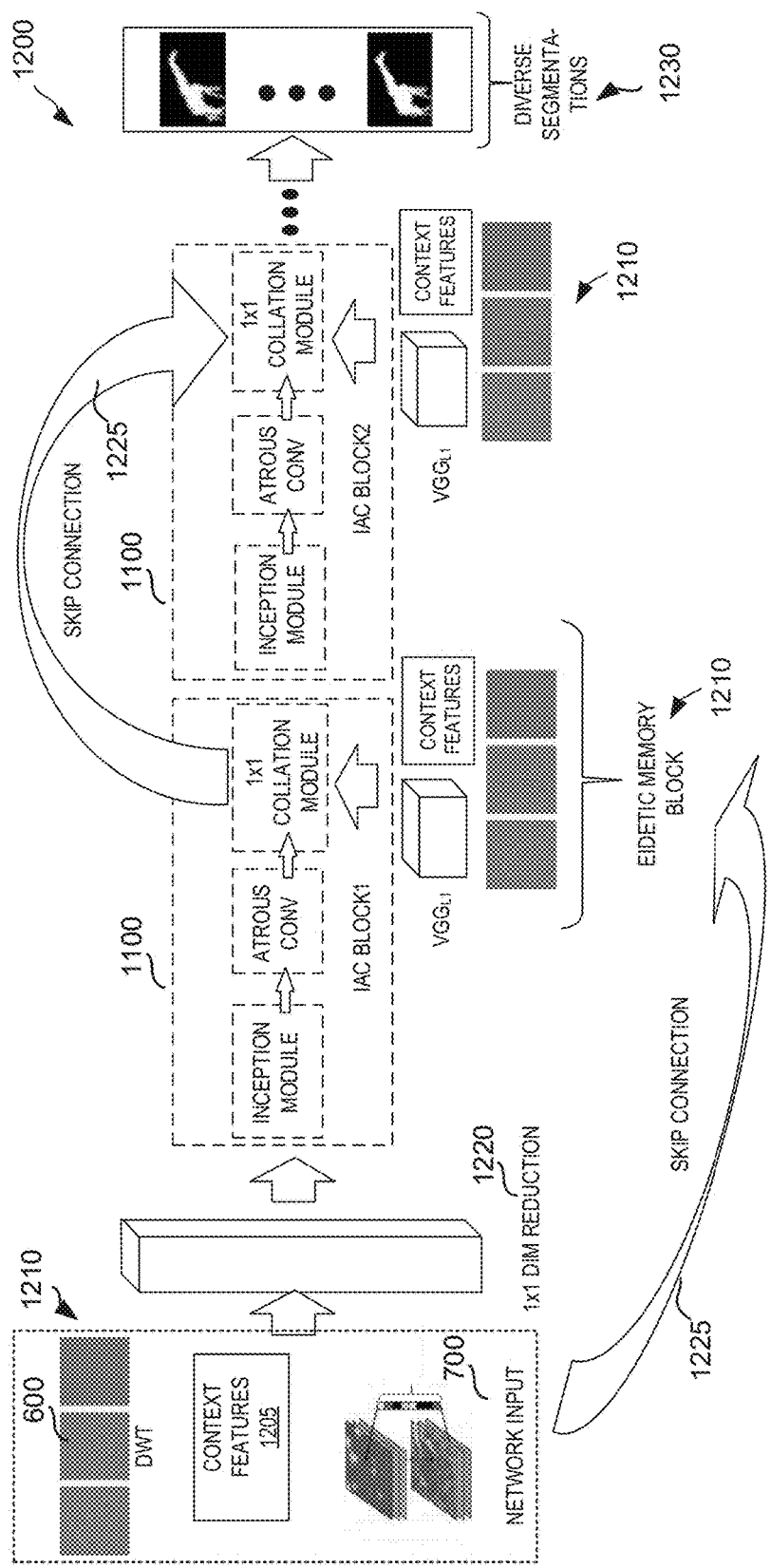
FIG. 12A is an illustration of an example pixel-level interactive segmentation network architecture with inclusion of eidetic memory block(s) (EMBs).
FIG. 12B is a representation of example testing results demonstrating efficacy of EMB-based inclusion in deep CNN-based architectures.
Figure 13:
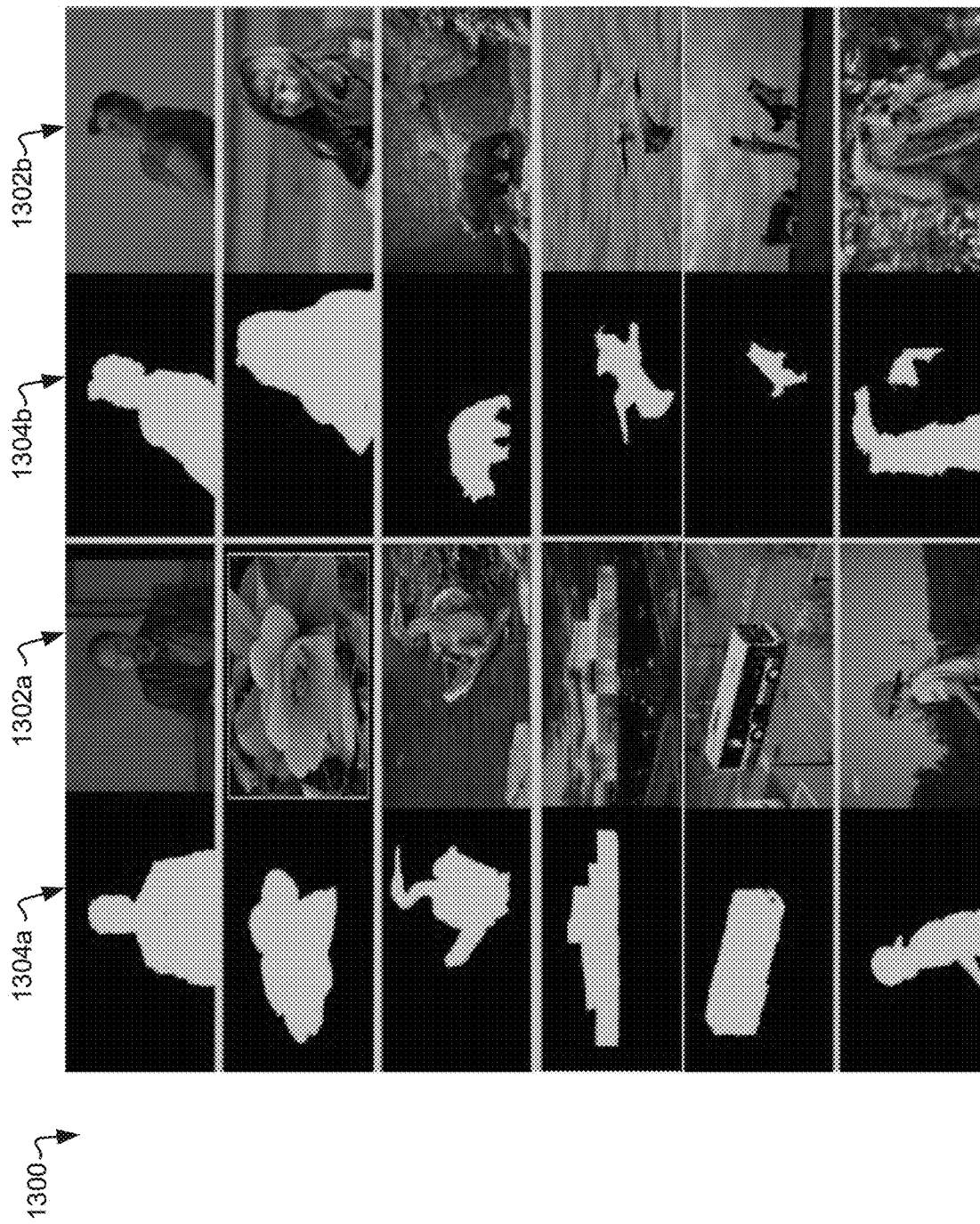
FIG. 13 is a graphical illustration showing segmentations produced by the interactive segmentation engine of FIG. 1 in combination with the eidetic memory block generator of FIG. 2.

The tester 212 performs assessments of segmentation results based on the application of domain-persistent features obtained using the eidetic memory block generator 144. For example, the tester 212 can be used to perform an ablation study to demonstrate the efficacy of the inclusion of EMBs in a deep CNN architecture. In some examples, two deep SOA models (e.g., one with EMBs and one without) can be used to compare segmentation results. For example, the tester 212 can use models that consists of 10 IAC Blocks, with testing performed on the high-fidelity task of interactive image segmentation. In some examples, the tester 212 can train both models using identical datasets consisting of 23,924 images (480×270 resolution). In some examples, the models can be additionally validated using 1,468 validation images, with both models receiving identical input features. As such, the tester 212 can be used to yield tabulated and/or graphical results as illustrated in FIGS. 12B and 13.

The database 214 can be used to store any information associated with the VGG feature extractor 202, the wavelet transformer 204, the edge-enhanced feature generator 206, the concatenator 208, the propagator 210, and/or the tester 212. The database 214 of the illustrated example of FIG. 2 can be implemented by any memory, storage device and/or storage disc for storing data such as flash memory, magnetic media, optical media, etc. Furthermore, the data stored in the example database 214 can be in any data format such as binary data, comma delimited data, tab delimited data, structured query language (SQL) structures, image data, etc.

While an example manner of implementing the eidetic memory block generator 144 of FIG. 2 is illustrated in FIGS. 1-2, one or more of the elements, processes and/or devices illustrated in FIG. 1-2 may be combined, divided, re-arranged, omitted, eliminated and/or implemented in any other way. Further, the example VGG feature extractor 202, the example wavelet transformer 204, the example edge-enhanced feature generator 206, the example concatenator 208, the example propagator 210, the example tester 212, and/or, more generally, the eidetic memory block generator 144 of FIG. 2 may be implemented by hardware, software, firmware and/or any combination of hardware, software and/or firmware. Thus, for example, any of the example VGG feature extractor 202, the example wavelet transformer 204, the example edge-enhanced feature generator 206, the example concatenator 208, the example propagator 210, the example tester 212, and/or, more generally, the eidetic memory block generator 144 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example VGG feature extractor 202, the example wavelet transformer 204, the example edge-enhanced feature generator 206, the example concatenator 208, the example propagator 210, and/or the example tester 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example eidetic memory block generator 144 of FIG. 2 may include one or more elements, processes and/or devices in addition to, or instead of, those illustrated in FIG. 1-2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
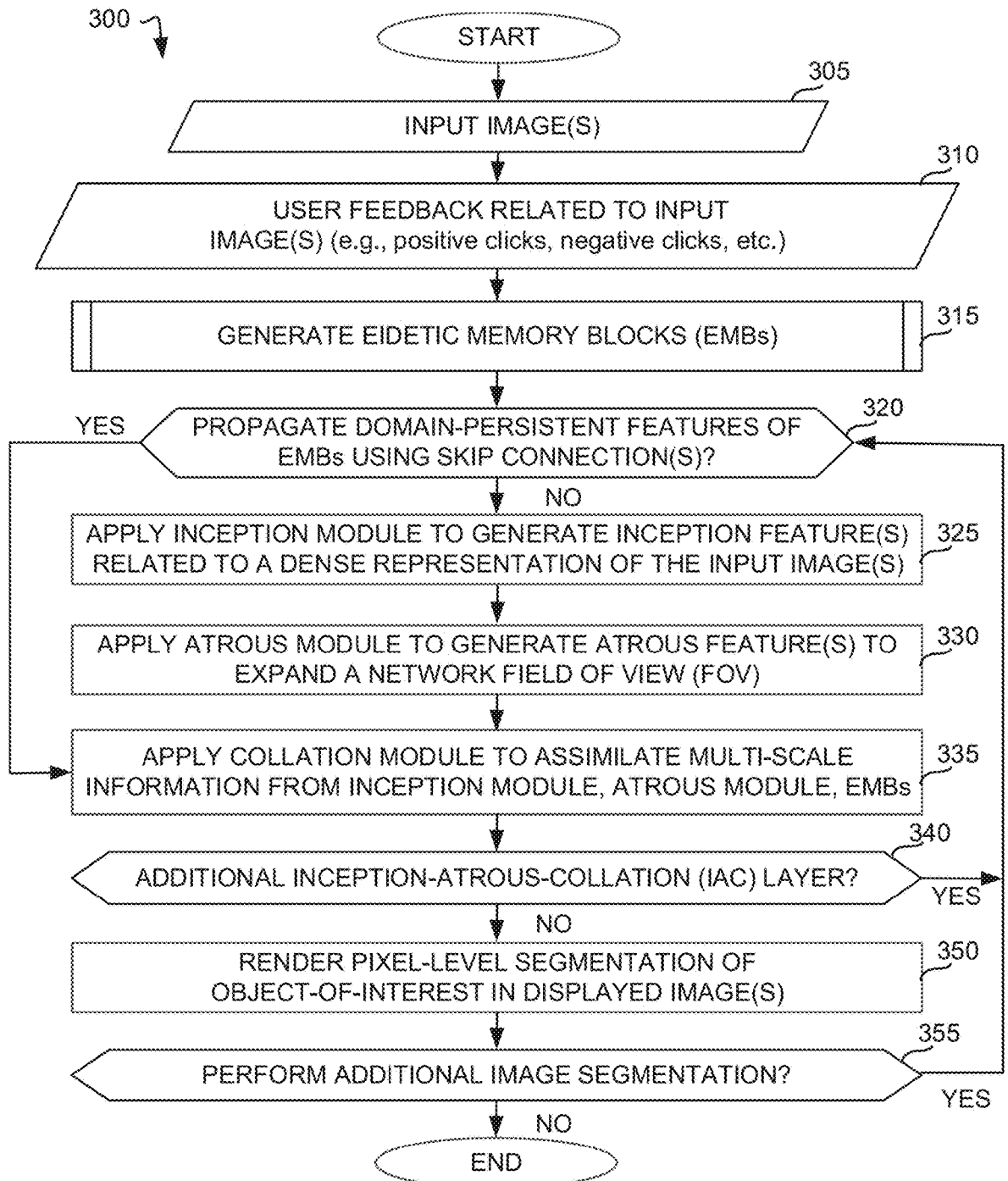
FIG. 3 is a flowchart representative of machine-readable instructions which may be executed to implement the interactive segmentation engine of FIG. 1.
Figure 4:
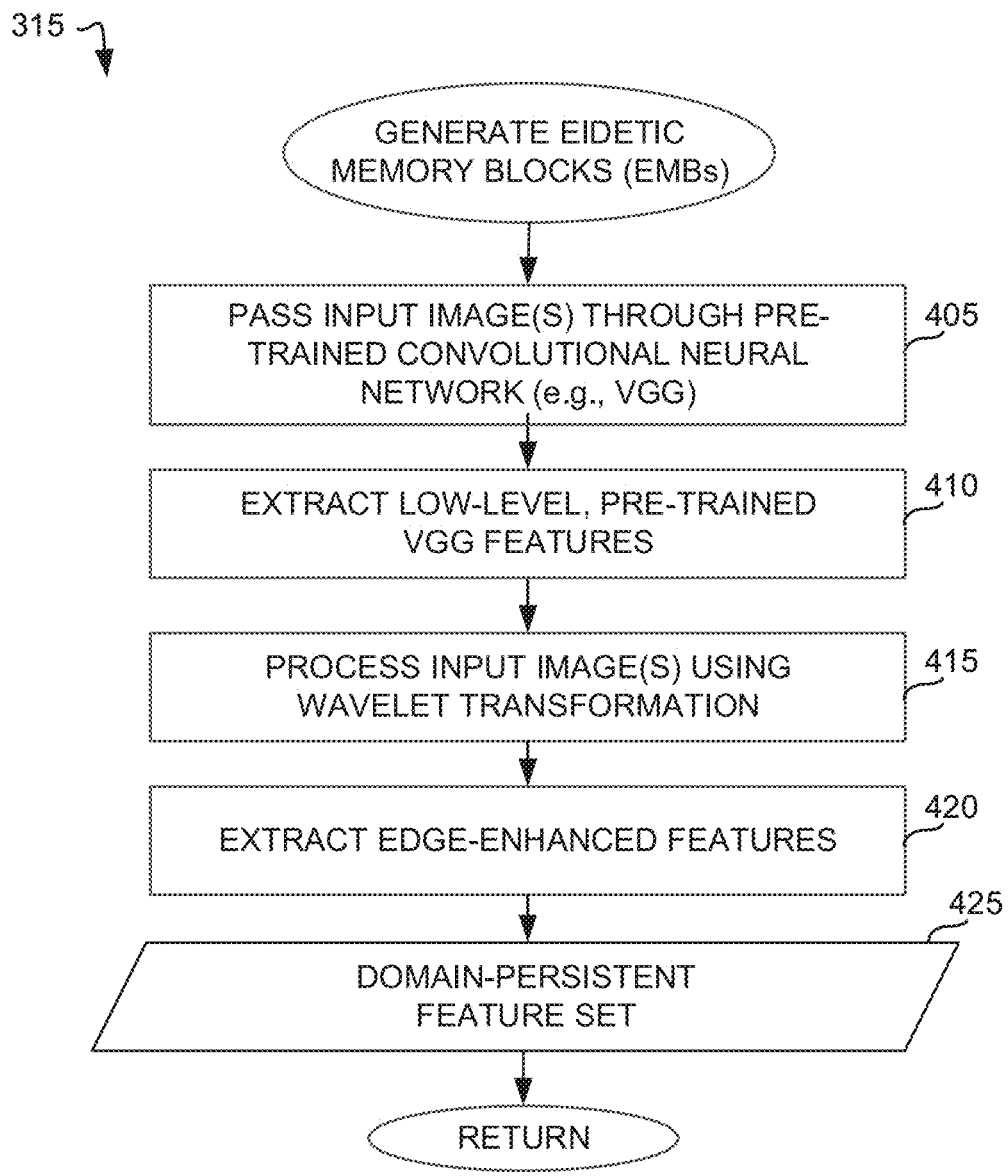
FIG. 4 is a flowchart representative of machine-readable instructions which may be executed to generate eidetic memory blocks using the eidetic memory block generator of FIG. 2.

A flowchart representative of example hardware logic, machine readable instructions, hardware implemented state machines, and/or any combination thereof for implementing the eidetic memory block generator 144 of FIG. 2 is shown in FIGS. 3-4. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIG. 3-4, many other methods of implementing the example eidetic memory block generator 144 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine-readable instructions 300 which may be executed to implement the interactive segmentation engine 130 of FIG. 1. In the examples of FIG. 3, the computing device(s) 110 can be used to provide input image(s) to the interactive segmentation engine 130 via the network 120 (block 305). In some examples, the communication processor 132 causes one or more images to be displayed on the computing device(s) 110

(e.g., one or more still images and/or one or more video clips). Furthermore, the communication processor 132 obtains user input on the input image(s) from the communication device(s) 110 (block 310). For example, the communication processor 132 obtains positive and/or negative clicks, as described in connection with FIG. 1. Once the input image data and/or the user feedback data related to the input image(s) is obtained by the interactive segmentation engine 130, the eidetic memory block generator 144 generates eidetic memory block(s) (EMBs) (block 315). For example, the eidetic memory block generator 144 obtains low-level features and/or edge-enhanced features from the input image data, as described in more detail in connection with FIG. 4. The generated EMBs can be used to propagate domain-persistent features through the segmentation network. For example, the model executor 134 can determine whether to propagate the domain-persistent features of the EMBs using skip connections (block 320). If the EMBs are used in the segmentation network using the skip connections, control proceeds to block 335, where the collation module generator 140 applies the collation module to assimilate multi-scale information. However, if the model executor 134 determines not to proceed with propagation, the inception module generator 136 proceeds to generate inception feature(s) related to a dense representation of the input image(s) (block 325). Once the inception feature(s) have been generated, the atrous module generator 138 generates atrous feature(s) to expand a network field of view (FOV), as described in connection with FIG. 1 (block 330). The collation module generator 140 proceeds to generate the collation module to assimilate information from the inception module, the atrous module, and/or the EMBs (block 335). In some examples, additional IAC layers can be present, such that the interactive segmentation engine 130 proceeds to apply the additional IAC layers (block 340). For example, a segmentation process can include 10 IAC blocks, such that the segmentation proceeds through several layers. If additional IAC layers are present, the interactive segmentation engine 130 proceeds to determine whether to propagate the EMB-based domain-persistent features using skip connections (block 320). If additional IAC layers are not present, the interactive segmentation engine 130 can render the pixel-level segmentation of the user-based object-of-interest (block 350). For example, based on the original input image provided via the computing device(s) 110, the output from the interactive segmentation network is a pixel-level segmentation of the object-of-interest as identified by a user based on negative and/or positive clicks. In some examples, the user and/or the interactive segmentation engine 130 determines that additional image segmentation needs to be performed (e.g., based on output image quality, number of IAC layers, etc.) (block 355). As such, control can return to block 320, where the interactive segmentation engine 130 determines whether to proceed with propagating domain-persistent features or initiating the inception module to generate inception feature(s).

FIG. 4 is a flowchart representative of machine-readable instructions 315 which may be executed to generate eidetic memory blocks using the eidetic memory block generator 144 of FIG. 2. In the example of FIG. 4, the eidetic memory block generator 144 receives the input image information (block 305 of FIG. 3) and passes the input image(s) through a pre-trained convolutional neural network (CNN) (block 405). For example, the VGG feature extractor 202 can be used to extract low-level, pre-trained VGG features, which creates a set of data for concatenation (block 410), as described in connection with FIG. 2. In some examples, the wavelet transformer 204 further processes the input image(s) using wavelet transformation (e.g., using a Haar wavelet function) (block 415). Based on the results of the wavelet transformation, the edge-enhanced feature generator 206 extracts vertical edge enhancement, horizontal edge enhancement, and/or diagonal edge enhancement data for the given input image (block 420). The concatenator 208 concatenates the obtained output from the VGG feature extractor 202 and/or the edge-enhanced feature generator 206 to yield the domain-persistent feature set (block 425) to be used during the segmentation process of FIG. 3.

Figure 5:
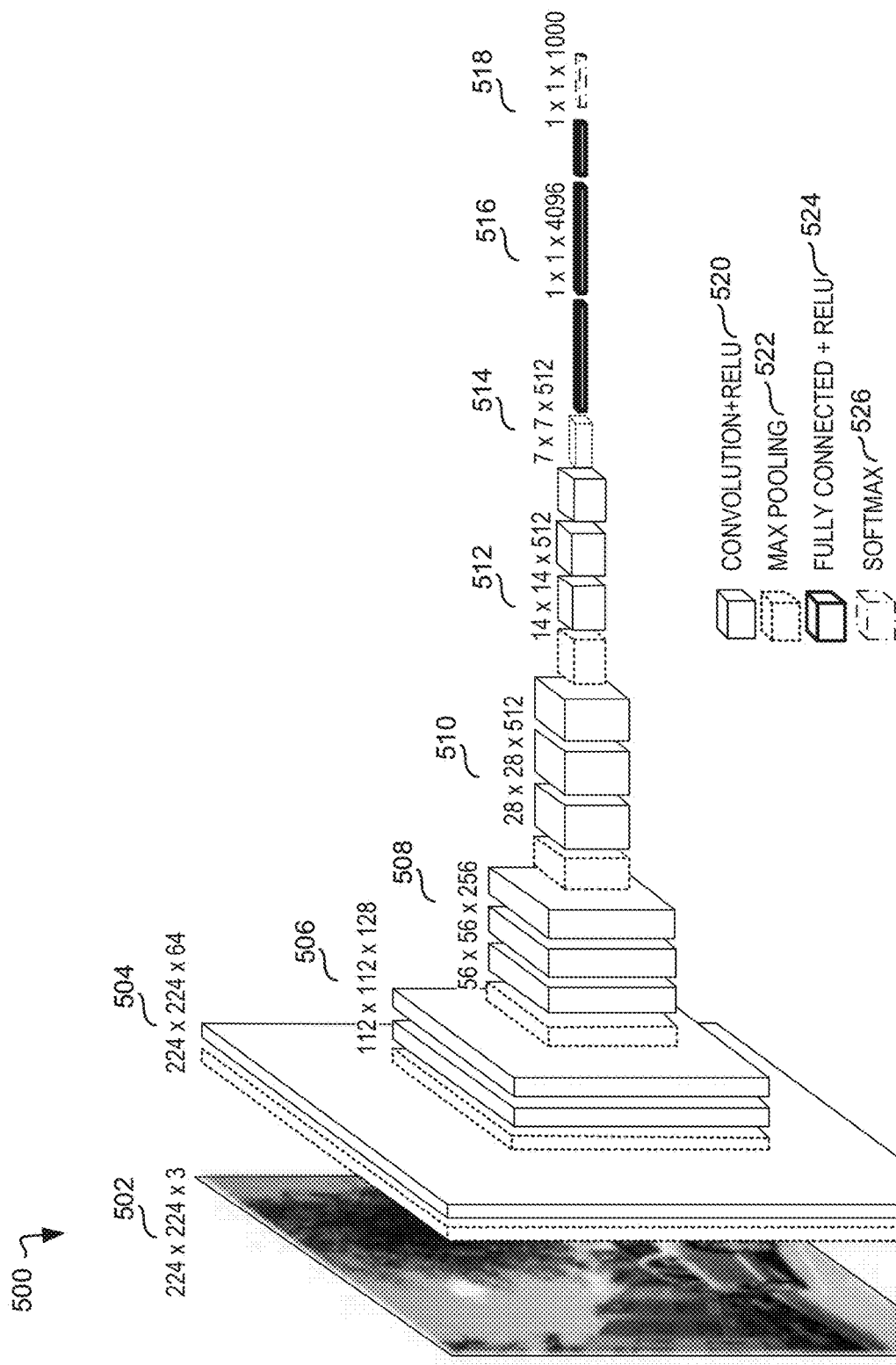
FIG. 5 is a graphical illustration showing an example Visual Geometry Group (VGG)-based convolutional neural network (CNN) architecture.

FIG. 5 is a graphical illustration showing an example Visual Geometry Group (VGG)-based convolutional neural network (CNN) architecture 500. To render part of the EMB, the VGG feature extractor 202 passes an input image (e.g., block 502) through a pre-trained CNN (e.g., VGG-19) and extracts activations from the CNN architecture. In the example of FIG. 5, these activations can correspond with the first convolutional block of dimension 224×224×64 (block 504). Such features capture low-level, domain-persistent features and are "dense" in the sense that these activations are generated in the native resolution of the input image and thus avoid information loss caused by sub-sampling in later layers of the network. As shown in the example of FIG. 5, CNNs include multiple other layers 506, 508, 510, 512, 514, 516, 518 (e.g., an input layer, an output layer, multiple hidden layers, etc.). For example, the hidden layers of a CNN include one or more convolutional layers, one or more rectified liner unit (ReLU) layers 520, one or more pooling layers 522, one or more fully connected layers 524, and/or one or more normalization layers 526.

FIG. 6 is a graphical illustration 600 showing an example discrete wavelet transformation applied to an example input image 605 to generate edge-enhanced features. For example, the wavelet transformer 204 and/or the edge-enhanced feature generator 206 can be used to extract example horizontal details 610, example vertical details 615, and/or example diagonal details 620. As such, the edge-enhanced feature generator 206 generates data related to the edge-enhanced features that are used as part of the eidetic memory block (EMB).

Figure 7A:
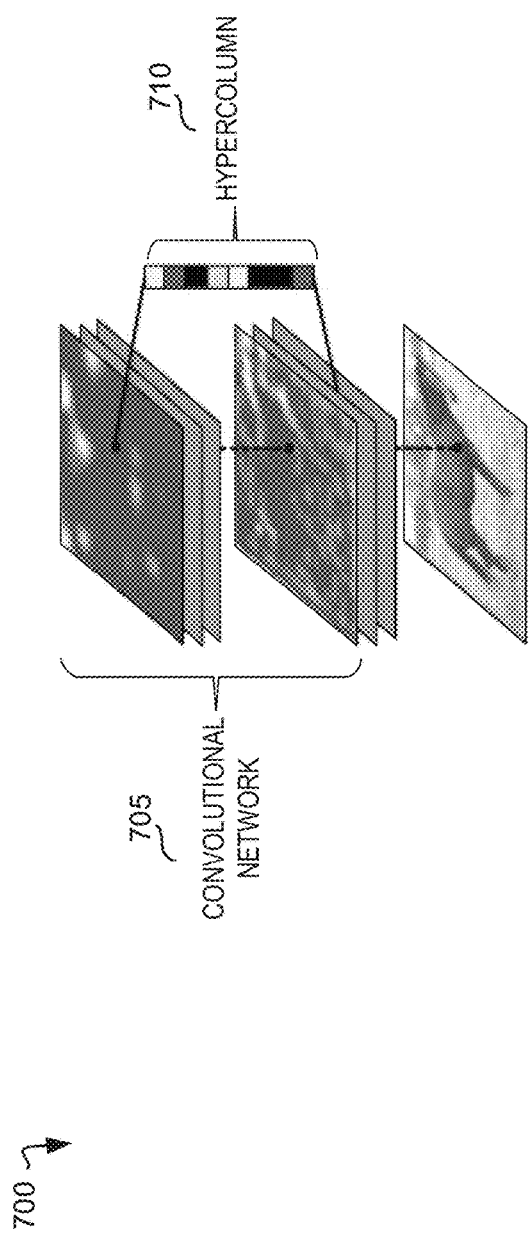
FIG. 7A is a graphical illustration of example VGG-rendered features used as input into a segmentation network during image processing.

FIG. 7A is a graphical illustration 700 of example VGG-rendered features used as input into a segmentation network during image processing. In the example of FIG. 7A, an example convolutional network 705 uses "dense", per-pixel VGG features to account for the high complexity of the latent space inherent to pixel-wise segmentation tasks. In FIG. 7A, an example dense, per-pixel hypercolumn 710 from a deep CNN can be generated as part of the input into the segmentation network. In some examples, the hypercolumn 710 provides a volume of features that are compressed to generate feature frames. The features volume(s) include per pixel hypercolumn deep features. In some examples, the feature volume(s) are compressed to generate feature frames. For example, feature frames may have the same resolution as current image (e.g., video frame) (e.g., horizontal and vertical dimensions equal to current video frame) and a depth, D, that is a fraction of the number of entries in each per pixel hypercolumn of the feature volume(s).

Figure 7B:
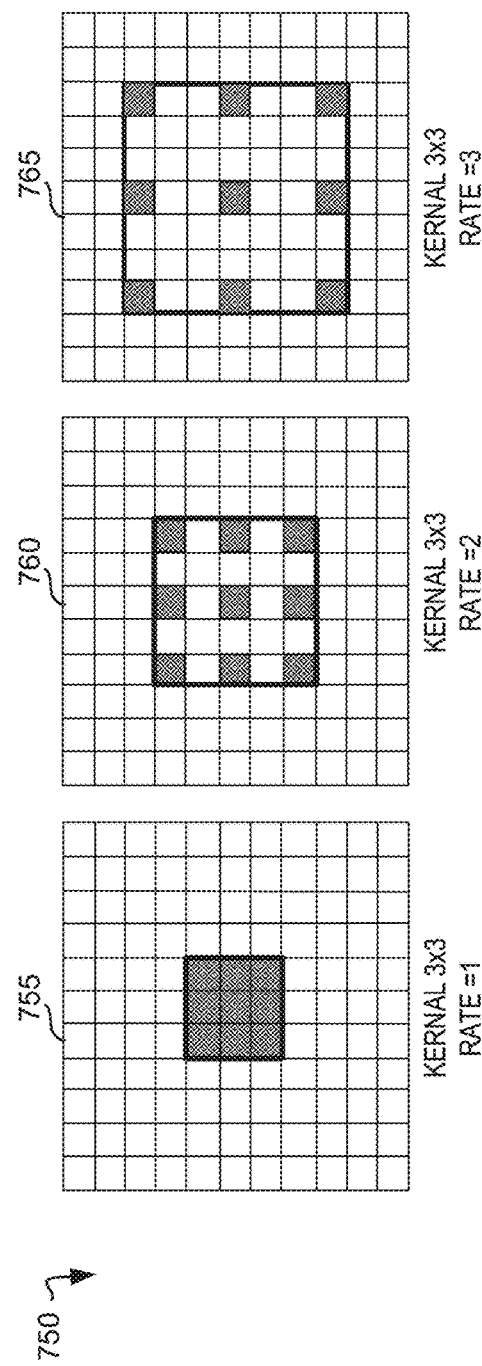
FIG. 7B is an illustration of an example atrous convolution operation.

FIG. 7B is an illustration 750 of an example atrous convolution operation. Atrous convolutions differ from traditional convolution operations for CNNs insofar as a dilation operation is applied to a given kernel (e.g., 3×3 or 5×5 kernel) prior to the application of convolution with an input datum. The central advantage provided by atrous convolution is that the network's receptive field is increased (i.e., field of view of correlated input image pixels grows) while fixing the number of parameters required. A simple example of atrous convolution shown in the example of FIG. 7B includes an example first convolution 755 for rate=1 (no dilation), an example second convolution 760 for rate=2, and an example third convolution 765 for rate=3 (e.g., for a 3×3 kernel). More formally, an atrous convolution in 1-D is defined as follows, where y[i] denotes the output of the 1-D atrous convolution for the input signal x[i] with respect to a filter w[k] of length K:

$$y[i] = \sum_{k=1}^{K} x[i + r \cdot k] w[k]$$

In some examples, the rate parameter of the atrous convolution is denoted by r as described previously. In some examples, the atrous convolution definition generalizes to a standard convolution operation.

FIG. 8A is an illustration 800 of an example sequential atrous convolution operation leading to gridding. In the example of FIG. 8A, "gridding" is shown to occur when atrous convolutions are applied in sequence. On the one hand, applying atrous convolutions in sequence represents an efficient means to grow the receptive field of the model while using a minimum number of parameters. However, in this way the network effectively "sees" larger objects. Conversely, stacking atrous convolutions one after the other renders a grid-like, sparse signal, exacerbating information loss in the network. In the example of FIG. 8A, stacking an example first atrous convolution 805 and an example second atrous convolution 810 results in the sparse signal shown in the example atrous convolution result 815. For high-fidelity vision problems such as pixel-level segmentation, this signal sparsity degrades the model output, and can be directly visible in segmentation applications.

FIG. 8B is an illustration 850 of an example interleaving conventional convolution operation with atrous convolutions in IAC blocks. FIG. 8B shows an example interleaving of conventional convolution operations of varying sizes with atrous convolutions of varying sizes and the collation of these features with context-based skip connections. Together, the components of the IAC block provide a solution to gridding by allowing for network paths that contribute simultaneously to increasing the network receptive field while densely populating the erstwhile sparse signal created by the atrous convolutions. For example, by executing the example IAC layers 855, 860, 865, the interactive segmentation engine 130 provides a solution to gridding by allowing for network paths of a deep CNN that contribute simultaneously to increasing the receptive field of view of the deep CNN while densely populating the sparse signal generated by the atrous convolutions. In the illustrated example of FIG. 8B, the interactive segmentation engine 130 densely populates the sparse signal generated by the atrous convolutions with inception features generated by the inception convolutions.

Figure 9:
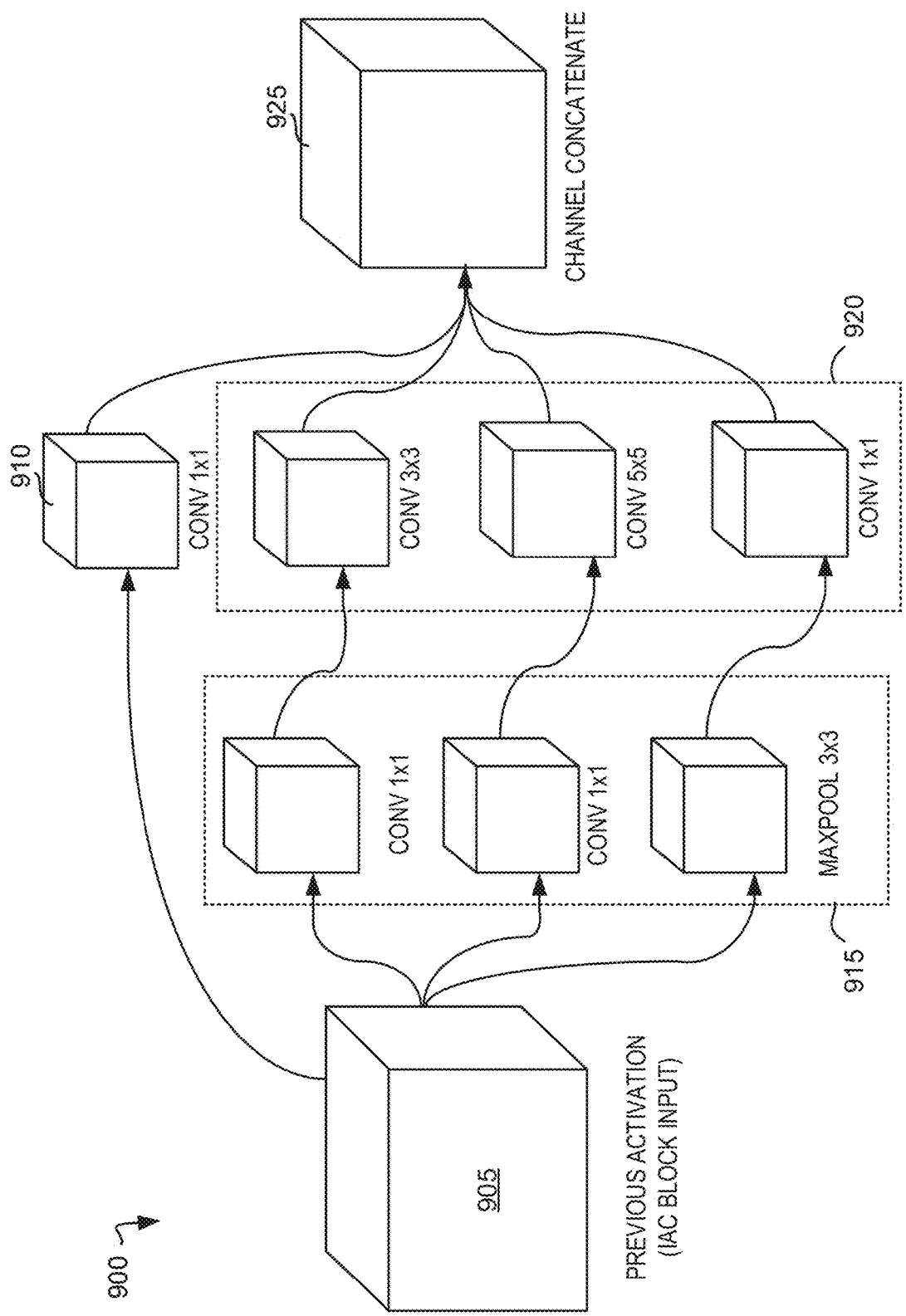
FIG. 9 is an illustration of an example inception module.

FIG. 9 is an illustration 900 of an example inception module. The inception module includes an example previous activation block 905 (e.g., IAC block input), an example first set of operations 915 executed by an inception module on the output of the previous activation block 905, an example second set of operations 920 executed by an inception module, and an example channel concatenate 925 resulting from the concatenation of the output of the second set of operations 920 performed by the inception module. In some examples, the path from operation 910 to operation 925 is referred to as a residual path that allows information to effectively bypass convolution operations altogether which preserves residual feature data.

Figure 10A:
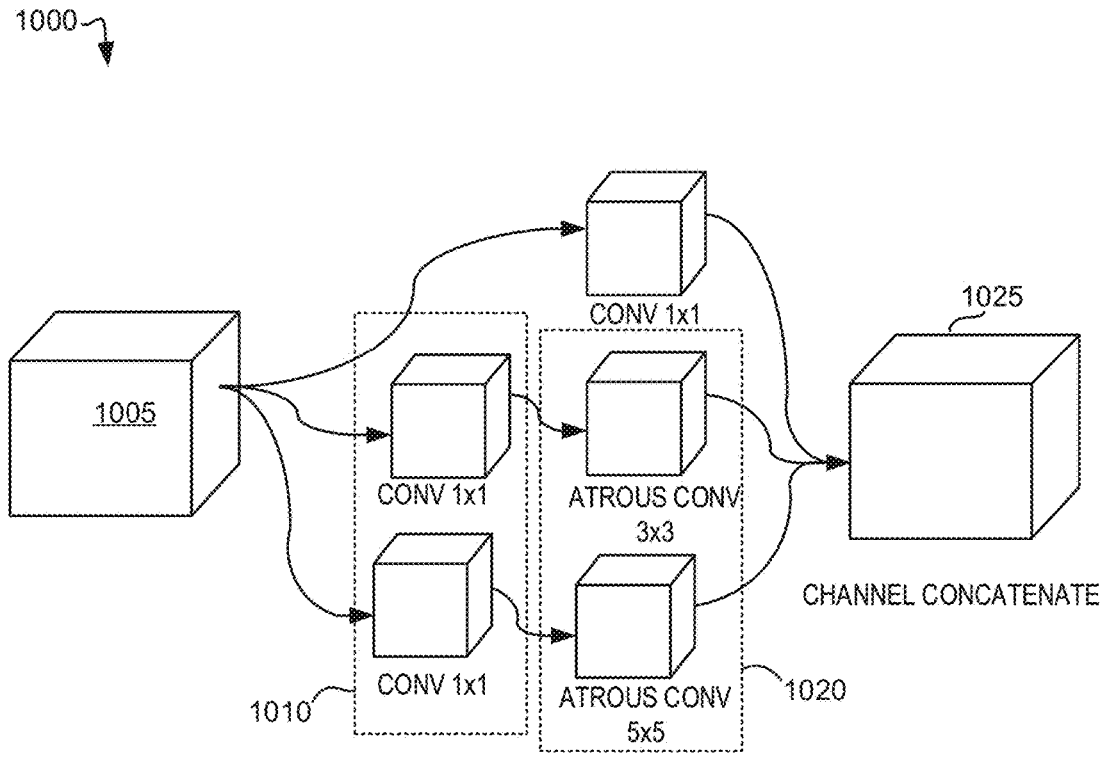
FIG. 10A is an illustration of an example atrous module.

FIG. 10A is an illustration 1000 of an example atrous module. The atrous module includes an example atrous sublayer 1005, an example first set of operations 1010, an example second set of operations 1020, and/or an example channel concatenate operation 1025. For example, the atrous module determines to skip the atrous sublayer if performing atrous convolutions would not be advantageous. An example 1×1 convolution operation can be performed (e.g., first set of operations 1010) on the input matrix and/or matrices from a first embedding sublayer. In some examples, the atrous module executes two or more atrous convolutions. For example, to execute the first set of operations 1010, the atrous module can perform two 1×1 convolutions. Additionally, the atrous module processes the outputs of the first set of operations 1010 via an example second set of operations 1020. For example, to execute the second set of operations 1020, the atrous module can perform a 3×3 atrous convolution on the output of the first 1×1 convolution and a 5×5 atrous convolution on the output of the second 1×1 convolution. The atrous module concatenates the output of the second set of operations 1020 via the channel concatenate operation 1025. In this manner, the atrous module generates one or more multi-scale atrous features to expand the effective receptive field of view of the pixel-level interactive segmentation.

Figure 10B:
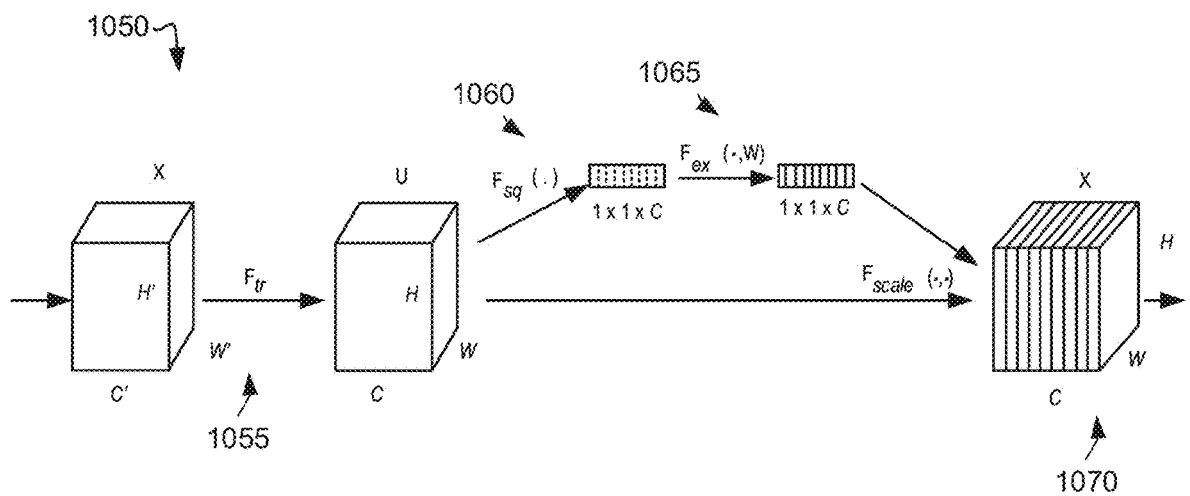
FIG. 10B is an illustration of an example squeeze-excitation module.

FIG. 10B is an illustration 1050 of an example squeeze-excitation module. In some examples, each module in the IAC block additionally includes a squeeze-excitation module that adaptively recalibrates channel-wise feature responses by explicitly modelling interdependencies between channels. For example, a transform operation 1055 can be performed to map an input matrix X to a feature map U. For example, the transform operation 1055 may be a convolution. Additionally, the squeeze-excitation module can execute an example squeeze operation 1060 that generates descriptors for the channel(s) of the input features (e.g., the output of operation 1055) by aggregating feature maps across the corresponding spatial dimensions. In the illustrated example of FIG. 10B, by executing operation 1060, the squeeze-excitation module embeds the global distribution of channel-wise features which allows for information from the pixel-level interactive segmentation to be used by all the layers of the pixel-level interactive segmentation. In the example of FIG. 10B, the squeeze-excitation module additionally executes an example excitation operation 1065 to generate per-channel modulation weights for the embedded features. Subsequently, the squeeze-excitation module executes an example channel concatenate operation 1070 on the result of the operation 1065. The squeeze-excitation module is further applied in the example IAC blocks of FIG. 11.

Figure 11:
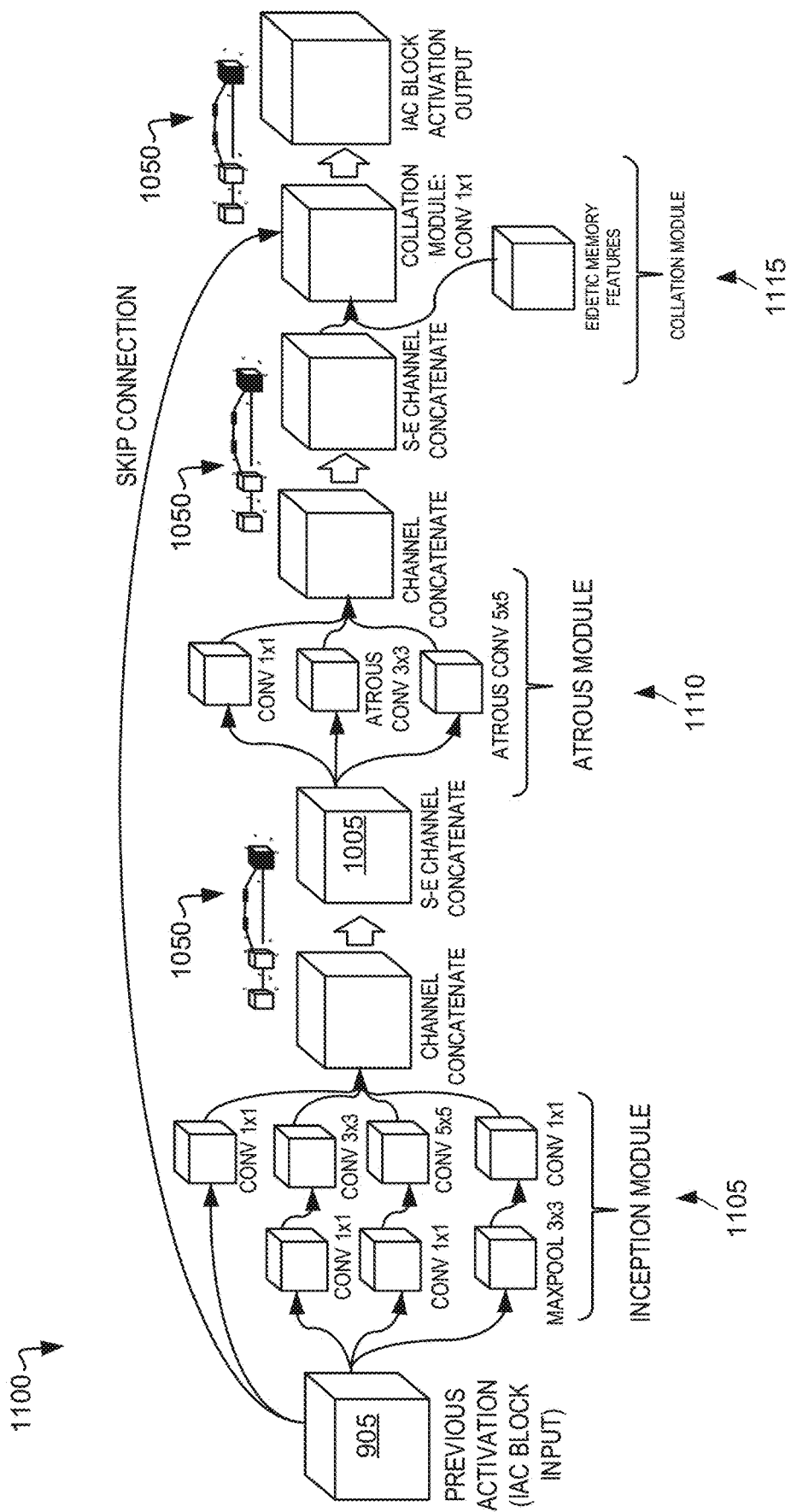
FIG. 11 is an illustration of an IAC block including the inception module of FIG. 9, the atrous module of FIG. 10A, and/or the collation module used in combination with the squeeze-excitation module of FIG. 10B.

FIG. 11 is an illustration 1100 of a full diagram of an inception-atrous-collation (IAC) block including the inception module of FIG. 9, the atrous module of FIG. 10A, and/or the collation module used in combination with the squeeze-excitation module of FIG. 10B. In the example of FIG. 11, an example inception module 1105, an example atrous module 1110, and an example collation module 1115 are shown in combination to represent the full interactive segmentation process, which includes the squeeze-excitation module 1050 of FIG. 10B. In the example of FIG. 11, the collation module provides the network with a means to calibrate persistent components of the network input (e.g.

input image, user-provided labels) with densely rendered, multi-scale features. The network uses these persistent features as a template for determining the importance of different multi-scale features. Because the network does not need to allocate extra overhead to encode these persistent features, the network gains additional efficiency. For example, the collation module 1115 includes eidetic memory features, which are shown in greater detail in connection with FIG. 12A.

FIG. 12A is an illustration 1200 of an example pixel-level interactive segmentation network architecture with inclusion of eidetic memory block(s) (EMBs). The example of FIG. 12A includes an example EMB 1210, which includes example DTW features 600, example context features 1205, and example network input 700 (e.g., hypercolumns of FIG. 7). Inclusion of example skip connections 1225 propagating domain-persistent features contained in the EMBs 1210 is shown integrated into layers of IAC Blocks of the segmentation network. For example, this network can include 10 IAC blocks, for which each respective collation module receives an EMB as input. The final output of the segmentation is an example diverse segmentation 1230 of the original input image.

FIG. 12B is a representation of example testing results 1280 demonstrating efficacy of EMB-based inclusion in deep CNN-based architectures. The example testing results include an example model-type tested 1286 (e.g., baseline test without EMBs 1282 and/or baseline test with EMBs 1284), an example mean train loss 1288, an example value of the mean validation 1290, and an example value of the median validation 1292. For example, the mean train loss 1288 can be reported after 10 epochs for each model. Additionally, the mean validation IOU 1290 (intersection-over-union) and median validation IOU 1292 are included, with the IOU representing a standard metric ([0,1]) used to assess segmentation quality (e.g., where 1 denotes a perfect segmentation). The example results 1280 indicate a decreased mean train loss when using EMBs incorporated into the interactive segmentation network, as opposed to the baseline without the use of EMBs.

FIG. 13 is a graphical illustration 1300 showing segmentations produced by the interactive segmentation engine of FIG. 1 in combination with the eidetic memory block generator of FIG. 2. The graphical illustration 1300 includes example input images 1302a, 1302b and corresponding example high-fidelity segmentations 1304a, 1304b generated by the interactive segmentation engine 302 in combination with EMBs when executing the pixel-level interactive segmentation. The results of the graphical illustrations indicate precise pixel-level segmentations of the original input images, thereby increasing overall accuracy and reproducibility of the segmentation network.

Figure 14:
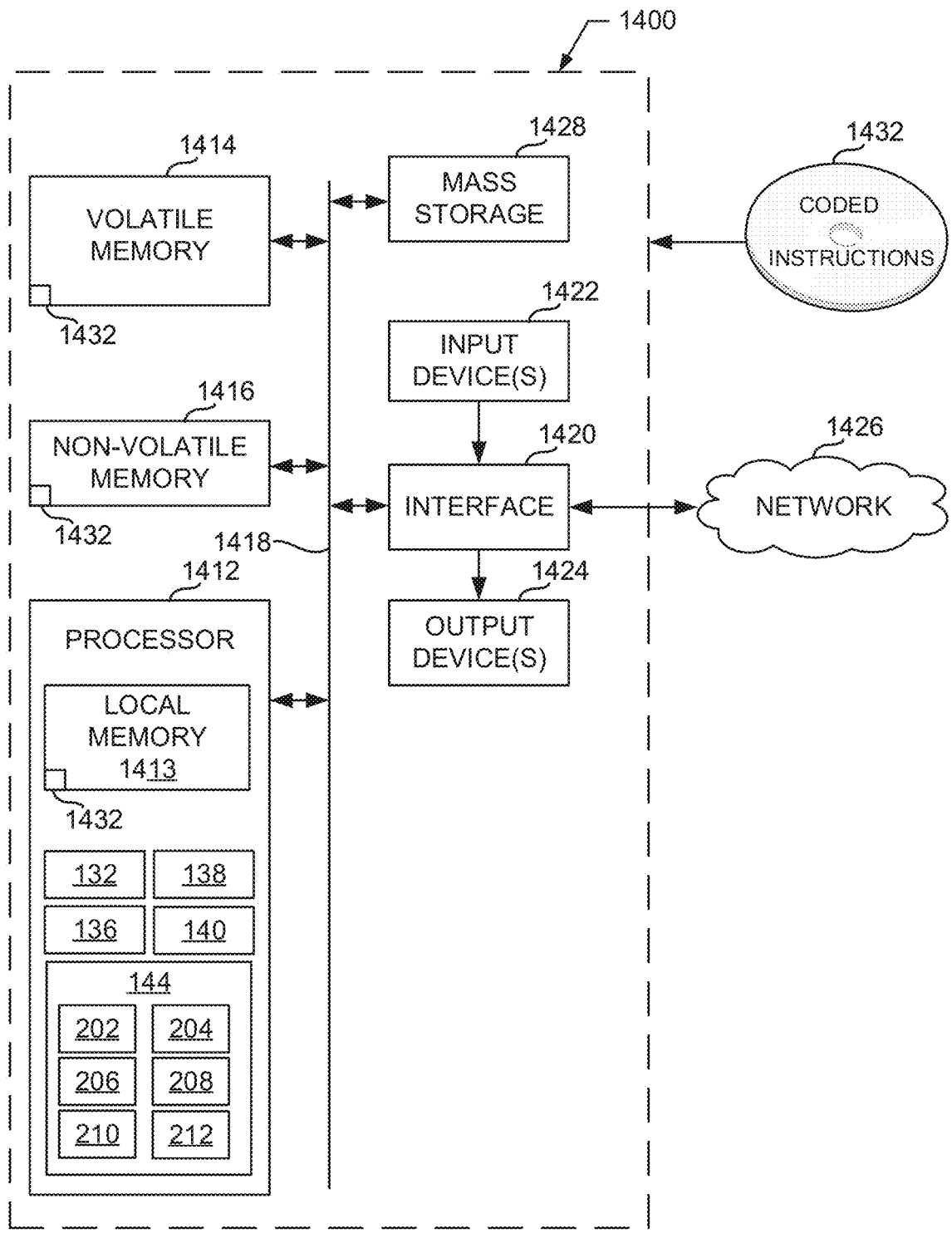
FIG. 14 is a block diagram of an example processing platform structured to execute the instructions of FIGS. 3-4 to implement the pixel-level interactive segmentation engine of FIG. 1 and the eidetic memory block generator of FIG. 2.

FIG. 14 is a block diagram of an example processing platform structured to execute the instructions of FIGS. 3-4 to implement the pixel-level interactive segmentation engine of FIG. 1 and the eidetic memory block generator of FIG. 2. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor 1412 may be a semiconductor based (e.g., silicon based) device. In this example, the processor implements the example communication processor 132, the example inception module generator 136, the example atrous module generator 138, the example collation module generator 140, the example eidetic memory block generator 114, the example VGG feature extractor 202, the example wavelet transformer 204, the example edge-enhanced feature generator 206, the example concatenator 208, the example propagator 210, and/or the example tester 212.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 corresponding to the instructions of FIGS. 7, 8, 9, 10, and/or 11 may be stored in the mass storage device 1428, in the volatile memory 1414, in the non-volatile memory 1416, in the local memory 1413 and/or on a removable non-transitory computer readable storage medium, such as a CD or DVD 1436.

Figure 15:
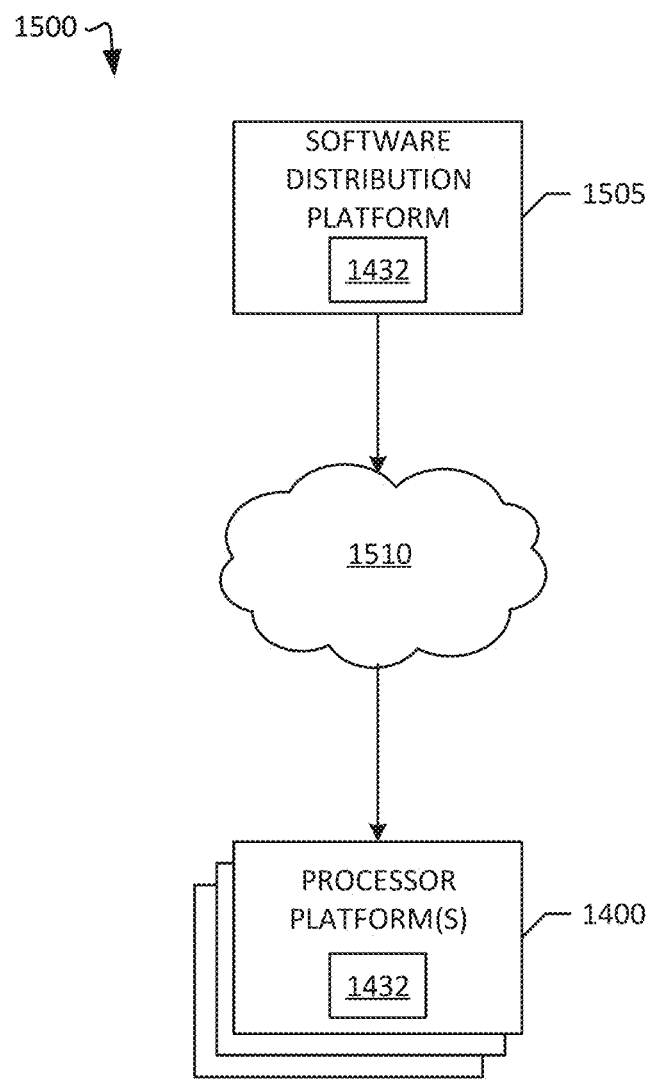
FIG. 15 is a block diagram of an example software distribution platform to distribute software (e.g., software corresponding to the example computer readable instructions of FIG. 14) to client devices such as those owned and/or operated by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram 1500 illustrating an example software distribution platform 1505 to distribute software such as the example computer readable instructions 1432 of FIG. 14 to third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1432 of FIG. 14. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the computer readable instructions 1432, which may correspond to the example computer readable instructions of FIG. 14, as described above. The one or more servers of the example software distribution platform 1505 are in communication with a network 1510, which may correspond to any one or more of the Internet and/or any of the example networks 1426 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1432 from the software distribution platform 1505. For example, the software, which may correspond to the example computer readable instructions of FIGS. 3 and/or 4, may be downloaded to the example processor platform 1500, which is to execute the computer readable instructions 1432. In some examples, one or more servers of the software distribution platform 1505 periodically offer, transmit, and/or force updates to the software (e.g., the example computer readable instructions 1432 of FIG. 15) to ensure improvements, patches, updates, etc. are distributed and applied to the software at the end user devices.

From the foregoing, it will be appreciated that methods and apparatus disclosed herein present a general CNN architectural innovation to allow for recurrent processing of (i) low-level pre-trained image features, (ii) edge-enhanced features rendered using a wavelet transformation, and (iii) various contextual image features. These domain-persistent features represent many of the most informative features and fundamental building blocks for general image processing tasks. Furthermore, methods and apparatus disclosed herein use eidetic memory blocks (EMBs) to address the high-fidelity problem of interactive object segmentation and can be applied to automating the task of rotoscoping (e.g., the process of transferring an image into another video sequence) for graphics effects workflows, as well as other applications (e.g., medical imaging, etc.).

Example methods, apparatus, systems, and articles of manufacture for high-fidelity vision tasks using deep neural networks are disclosed herein. Further examples and combinations thereof include the following:

Example 1 includes an apparatus comprising a feature extractor to extract low-level features and edge-enhanced features of an input image processed using a convolutional neural network, an eidetic memory block generator to generate an eidetic memory block using the extracted low-level features or the extracted edge-enhanced features, and an interactive segmentation network to perform image segmentation using the eidetic memory block, the eidetic memory block used to propagate domain-persistent features through the segmentation network.

Example 2 includes the apparatus of example 1, wherein the interactive segmentation network includes an inception module, an atrous module, or a collation module.

Example 3 includes the apparatus of example 2, wherein the collation module assimilates multi-scale information from the inception module, the atrous module, or the eidetic memory block.

Example 4 includes the apparatus of example 1, wherein the low-level features are extracted using a VGG network.

Example 5 includes the apparatus of example 1, wherein the edge-enhanced features are extracted using a wavelet transformation.

Example 6 includes the apparatus of example 1, wherein the input image includes user-based input image feedback, the input image feedback including a positive click or a negative click to identify an object of interest within the input image.

Example 7 includes a method, comprising extracting low-level features and edge-enhanced features of an input image processed using a convolutional neural network, generating an eidetic memory block using the extracted low-level features or the extracted edge-enhanced features, and performing image segmentation using the eidetic memory block, the eidetic memory block used to propagate domain-persistent features through an interactive segmentation network.

Example 8 includes the method of example 7, further including assimilating multi-scale information from an inception module, an atrous module, or the eidetic memory block.

Example 9 includes the method of example 7, wherein the low-level features are extracted using a VGG network.

Example 10 includes the method of example 7, wherein the edge-enhanced features are extracted using a wavelet transformation.

Example 11 includes the method of example 7, further including receiving user-based input image feedback, the input image feedback including a positive click or a negative click to identify an object of interest within the input image.

Example 12 includes the method of example 7, wherein performing image segmentation includes an inception module to generate inception features or an atrous module to generate atrous features.

Example 13 includes the method of example 12, wherein performing image segmentation includes skipping the inception module or the atrous module to proceed directly to a collation module, the collation module to use the domain-persistent features of the eidetic memory block.

Example 14 includes At least one non-transitory computer readable medium comprising instructions that, when executed, cause at least one processor to at least extract low-level features and edge-enhanced features of an input image processed using a convolutional neural network, generate an eidetic memory block using the extracted low-level features or the extracted edge-enhanced features, and perform image segmentation using the eidetic memory block, the eidetic memory block used to propagate domain-persistent features through an interactive segmentation network.

Example 15 includes the at least one non-transitory computer readable medium as defined in example 14, wherein the instructions, when executed, cause the at least one processor to assimilate multi-scale information from an inception module, an atrous module, or the eidetic memory block.

Example 16 includes the at least one non-transitory computer readable medium as defined in example 14, wherein the instructions, when executed, cause the at least one processor to extract low-level features using a VGG network.

Example 17 includes the at least one non-transitory computer readable medium as defined in example 14, wherein the instructions, when executed, cause the at least one processor to extract edge-enhanced features using a wavelet transformation.

Example 18 includes the at least one non-transitory computer readable medium as defined in example 14, wherein the instructions, when executed, cause the at least one processor to receive user-based input image feedback, the input image feedback including a positive click or a negative click to identify an object of interest within the input image.

Example 19 includes the at least one non-transitory computer readable medium as defined in example 14, wherein the instructions, when executed, cause the at least one processor to perform image segmentation using an inception module to generate inception features or an atrous module to generate atrous features.

Example 20 includes the at least one non-transitory computer readable medium as defined in example 14, wherein the instructions, when executed, cause the at least one processor to skip an inception module or an atrous module to proceed directly to a collation module, the collation module to use the domain-persistent features of the eidetic memory block.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry:
   machine-readable instructions; and
   at least one processor circuit to be programmed by the machine-readable instructions to:
   extract low-level features and edge-enhanced features of an input image processed using a convolutional neural network;
   generate an eidetic memory block using the extracted low-level features or the extracted edge-enhanced features;
   perform image segmentation using the eidetic memory block, the eidetic memory block used to propagate domain-persistent features through a segmentation network, wherein the image segmentation includes skipping generation of inception features or atrous features to proceed to generation of collation features, the collation features generated based on the domain-persistent features of the eidetic memory block; and
   apply the image segmentation to an object of interest in the input image to identify a pixel-level segmentation of the object.

2. The apparatus of claim 1, wherein one or more of the at least one processor circuit is to cause the segmentation network to generate the inception features, the atrous features, or the collation features.

3. The apparatus of claim 1, wherein the generation of the collation features assimilates multi-scale information from the inception features, the atrous features, or the eidetic memory block.

4. The apparatus of claim 1, wherein the low-level features are extracted using a Visual Geometry Group (VGG) network.

5. The apparatus of claim 1, wherein the edge-enhanced features are extracted using a wavelet transformation.

6. The apparatus of claim 1, wherein the input image includes user-based input image feedback, the input image feedback including a positive click or a negative click to identify the object of interest within the input image.

7. A method, comprising:
   extracting low-level features and edge-enhanced features of an input image processed using a convolutional neural network;
   generating an eidetic memory block using the extracted low-level features or the extracted edge-enhanced features;
   performing image segmentation using the eidetic memory block, the eidetic memory block used to propagate domain-persistent features through a segmentation network, wherein the image segmentation includes skipping generation of inception features or atrous features to proceed to generation of collation features, the collation features generated based on the domain-persistent features of the eidetic memory block; and
   applying, by at least one processor circuit programmed by at least one instruction, the image segmentation to an object of interest in the input image to identify a pixel-level segmentation of the object.

8. The method of claim 7, further including assimilating multi-scale information from the inception features, the atrous features, or the eidetic memory block.

9. The method of claim 7, wherein the low-level features are extracted using a Visual Geometry Group (VGG) network.

10. The method of claim 7, wherein the edge-enhanced features are extracted using a wavelet transformation.

11. The method of claim 7, further including receiving user-based input image feedback, the input image feedback including a positive click or a negative click to identify the object of interest within the input image.

12. The method of claim 7, wherein the performing of the image segmentation includes generating the inception features or generating the atrous features.

13. At least one non-transitory computer readable medium comprising instructions to cause at least one processor circuit to at least:
   extract low-level features and edge-enhanced features of an input image processed using a convolutional neural network;
   generate an eidetic memory block using the extracted low-level features or the extracted edge-enhanced features;

perform image segmentation using the eidetic memory block, the eidetic memory block used to propagate domain-persistent features through a segmentation network, wherein the image segmentation includes skipping generation of inception features or atrous features to proceed to generation of collation features, the collation features generated based on the domain-persistent features of the eidetic memory block; and apply the image segmentation to an object of interest in the input image to identify a pixel-level segmentation of the object.

14. The at least one non-transitory computer readable medium as defined in claim 13, wherein the instructions are to cause one or more of the at least one processor circuit to assimilate multi-scale information from the inception features, the atrous features, or the eidetic memory block.

15. The at least one non-transitory computer readable medium as defined in claim 13, wherein the instructions are to cause one or more of the at least one processor circuit to extract the low-level features using a Visual Geometry Group (VGG) network.

16. The at least one non-transitory computer readable medium as defined in claim 13, wherein the instructions are to cause one or more of the at least one processor circuit to extract the edge-enhanced features using a wavelet transformation.

17. The at least one non-transitory computer readable medium as defined in claim 13, wherein the instructions are to cause one or more of the at least one processor circuit to receive user-based input image feedback, the input image feedback including a positive click or a negative click to identify the object of interest within the input image.

18. The at least one non-transitory computer readable medium as defined in claim 13, wherein the instructions are to cause one or more of the at least one processor circuit to perform the image segmentation to generate the inception features or generate the atrous features.

* * * * *